United States Patent
El-Gamal et al.

(10) Patent No.: US 7,643,569 B2
(45) Date of Patent: Jan. 5, 2010

(54) SPACE-TIME TRELLIS CODE FOR ORTHOGONAL FREQUENCY DIVISION MULTIPLEXING (OFDM)

(75) Inventors: Hesham El-Gamal, Dublin, OH (US); Roger Hammons, N. Potomac, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 64 days.

(21) Appl. No.: 11/603,777

(22) Filed: Nov. 22, 2006

(65) Prior Publication Data

US 2007/0064826 A1    Mar. 22, 2007

Related U.S. Application Data

(63) Continuation of application No. 10/011,631, filed on Nov. 5, 2001, now Pat. No. 7,177,365.

(60) Provisional application No. 60/246,022, filed on Nov. 6, 2000.

(51) Int. Cl.
*H04B 7/02* (2006.01)

(52) U.S. Cl. .................. 375/267; 375/347; 375/279; 375/348; 455/500; 455/132

(58) Field of Classification Search ............. 375/267
See application file for complete search history.

(56) References Cited

U.S. PATENT DOCUMENTS 6,144,711 A * 11/2000 Raleigh et al. ............ 375/347
6,563,884 B1 * 5/2003 Nikula ..................... 375/295
6,614,861 B1   9/2003 Terry et al.
6,928,120 B1 * 8/2005 Zhang ...................... 375/260
7,177,365 B2 * 2/2007 El-Gamal et al. ........... 375/267

* cited by examiner

*Primary Examiner*—Shuwang Liu
*Assistant Examiner*—Lihong Yu

(57) ABSTRACT

A communication system for transmitting encoded signals over a communication channel is disclosed. The system includes a transmitter, which has a source that is configured to output a plurality of input signals. The transmitter also includes an encoder that is configured to generate a plurality of output signals in response to the plurality of the input signals to output a code word according to the plurality of output signals, wherein the code word has a predetermined algebraic construction for space-frequency coding based upon the communication channel being characterized as a frequency selective block fading channel. Further, the transmitter includes a modulator that is configured to modulate the code word for transmission over the communication channel, and a plurality of transmit antennas that configured to transmit the modulated code word over the communication channel. The system encompasses a receiver that includes a plurality of receive antennas, in which the receiver is configured to receive the transmitted code word via the plurality of receive antennas. The receiver employs an OFDM-front end to transform the Intersymbol Interference (ISI) channel characteristics of the communication channel to selective block fading characteristics.

8 Claims, 12 Drawing Sheets

SPACE-TIME TRELLIS CODE FOR ORTHOGONAL FREQUENCY DIVISION MULTIPLEXING (OFDM)

CROSS-REFERENCES TO RELATED APPLICATIONS

This application is a continuation of U.S. patent application Ser. No. 10/011,631 filed Nov. 5, 2001 now U.S. Pat. No. 7,177,365, entitled "Space-Time Trellis Code for Orthogonal Frequency Division Multiplexing (OFDM)", which claims the benefit of the earlier filing date of U.S. Provisional Patent Application Ser. No. 60/246,022 filed Nov. 6, 2000, entitled "Space-Time Trellis Codes for OFDM," all of which are incorporated herein by reference in their entirety.

BACKGROUND OF THE INVENTION

1. Field of the Invention

The present invention relates to coding in a communication system, and is more particularly related to space-time codes that exploit multiple forms of diversity.

2. Discussion of the Background

Given the constant demand for higher system capacity of wireless systems, multiple antenna systems have emerged to increase system bandwidth vis-à-vis single antenna systems. In multiple antenna systems, data is parsed into multiple streams, which are simultaneously transmitted over a corresponding quantity of transmit antennas. At the receiving end, multiple receive antennas are used to reconstruct the original data stream. To combat the detrimental effects of the communication channel, communication engineers are tasked to develop channel codes that optimize system reliability and throughput in a multiple antenna system.

To minimize the effects of the communication channel, which typically is Rayleigh, space-time codes have been garnered significant attention. Rayleigh fading channels introduce noise and attenuation to such an extent that a receiver may not reliably reproduce the transmitted signal without some form of diversity; diversity provides a replica of the transmitted signal. Space-time codes are two dimensional channel codes that exploit spatial transmit diversity, whereby the receiver can reliably detect the transmitted signal. Conventional designs of space-time codes have focused on maximizing spatial diversity in quasi-static fading channels and fast fading channels. However, real communication systems exhibit channel characteristics that are somewhere between quasi-static and fast fading. Accordingly, such conventional space-time codes are not optimized.

Further, other approaches to space-time code design assume that channel state information (CSI) are available at both the transmitter and receiver. Thus, a drawback of such approaches is that the design requires the transmitter and receiver to have knowledge of the CSI, which increases implementation costs because of the need for additional hardware. Moreover, these approaches view the transmit diversity attending the use of space-time codes as a substitute for time diversity; consequently, such space-time codes are not designed to take advantage of other forms of diversity.

Notably, information theoretic studies have shown that spatial diversity provided by multiple transmit and/or receive antennas allows for a significant increase in the capacity of wireless communication systems operated in a flat Rayleigh fading environment [1] [2]. Following this observation, various approaches for exploiting this spatial diversity have been proposed. In one approach, channel coding is performed across the spatial dimension as well as time to benefit from the spatial diversity provided by using multiple transmit antennas [3]. Tarokh et al. coined the term "space-time coding" for this scheme. One potential drawback of this scheme is that the complexity of the maximum likelihood (ML) decoder is exponential in the number of transmit antennas. Another approach, as proposed by Foshini [5], relies upon arranging the transmitted data stream into multiple independent layers and sub-optimal signal processing techniques at the receiver to achieve performance that is asymptotically close to the outage capacity with reasonable complexity. In this approach, no effort is made to optimize the channel coding scheme.

Conventional approaches to space-time coding design have focused primarily on the flat fading channel model. With respect to the treatment of multi-input multi-output (MIMO) frequency selective channels, one approach contends the that space-time codes that are designed to achieve a certain diversity order in flat fading channels achieve at least the same diversity order in frequency selective fading channels. Such an approach fails to exploit the spatial and frequency diversity available in the channel.

Based on the foregoing, there is a clear need for improved approaches for providing space-time codes that can be utilized in a multi-input multi-output (MIMO) selective fading channel. There is also a need to design space-time codes that can exploit spatial diversity as well as time diversity. There is also a need to improve system reliability without reducing transmission rate. There is a further need to simplify the receiver design. Therefore, an approach for constructing space-time codes that can enhance system reliability and throughput in a multiple antenna system is highly desirable.

SUMMARY OF THE INVENTION

The present invention addresses the above stated needs by providing space-frequency codes that optimally exploit the spatial and frequency diversity available in the multi-input multi-output (MIMO) selective block fading channels. At the receiving end, an OFDM-front end is utilized to transform the Intersymbol Interference (ISI) channel characteristics of the communication channel to selective block fading characteristics.

According to one aspect of the invention, a method for transmitting encoded signals over a communication channel of a communication system is provided. The method includes receiving a plurality of input signals. The method also includes generating a plurality of output signals in response to the plurality of the input signals, and outputting a code word according to the plurality of output signals. The code word has a predetermined algebraic construction for space-frequency coding based upon the communication channel being characterized as a frequency selective block fading channel. Under this approach, spatial diversity and frequency diversity are enhanced, without sacrificing transmission rate.

According to another aspect of the invention, an apparatus for encoding signals for transmission over a communication channel of a communication system is provided. The apparatus includes a source that is configured to output a plurality of input signals. The apparatus also includes an encoder that is configured to generate a plurality of output signals in response to the plurality of the input signals to output a code word according to the plurality of output signals. The code word has a predetermined algebraic construction for space-frequency coding based upon the communication channel being characterized as a frequency selective block fading channel. The above arrangement advantageously improves system throughput and system reliability of a communication system.

According to one aspect of the invention, an apparatus for encoding signals for transmission over a communication channel of a communication system is provided. The apparatus includes means for receiving a plurality of input signals and means for generating a plurality of output signals in response to the plurality of the input signals. Additionally, the apparatus includes means for outputting a code word according to the plurality of output signals, wherein the code word has a predetermined algebraic construction for space-frequency coding based upon the communication channel being characterized as a frequency selective block fading channel. The above arrangement advantageously provides increased system capacity.

According to another aspect of the invention, a communication system for transmitting encoded signals over a communication channel is disclosed. The system includes a transmitter, which has a source that is configured to output a plurality of input signals. The transmitter also includes an encoder that is configured to generate a plurality of output signals in response to the plurality of the input signals to output a code word according to the plurality of output signals, wherein the code word has a predetermined algebraic construction for space-frequency coding based upon the communication channel being characterized as a frequency selective block fading channel. Further, the transmitter includes a modulator that is configured to modulate the code word for transmission over the communication channel, and a plurality of transmit antennas that configured to transmit the modulated code word over the communication channel. The system encompasses a receiver that includes a plurality of receive antennas, in which the receiver is configured to receive the transmitted code word via the plurality of receive antennas. The above arrangement advantageously maximizes spatial and frequency diversity.

According to another aspect of the invention, a waveform signal for transmission over a communication channel of a communication system is disclosed. The waveform signal includes a code word that has a predetermined algebraic construction for space-frequency coding based upon the communication channel being characterized as a frequency selective block fading channel, wherein the code word is transmitted via a plurality of antennas. The above approach minimizes data transmission errors.

In yet another aspect of the invention, a computer-readable medium carrying one or more sequences of one or more instructions for transmitting encoded signals over a communication channel of a communication system is disclosed. The one or more sequences of one or more instructions include instructions which, when executed by one or more processors, cause the one or more processors to perform the step of receiving a plurality of input signals. Another step includes generating a plurality of output signals in response to the plurality of the input signals. Yet another step includes outputting a code word according to the plurality of output signals, wherein the code word has a predetermined algebraic construction for space-frequency coding based upon the communication channel being characterized as a frequency selective block fading channel. This approach advantageously provides simplified receiver design.

In yet another aspect of the present invention, an apparatus for receiving signals over a communication channel of a communication system is provided. The apparatus includes a demodulator that is configured to demodulate a signal containing a code word transmitted from a plurality of transmit antennas of the communication system. The code word has a predetermined algebraic construction for space-frequency coding based upon the communication channel being characterized as a frequency selective block fading channel. Additionally, the apparatus includes a decoder that is configured to decode the code word and to output a message signal. Under this approach, the effective bandwidth of the communication system is increased.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to Binary Phase-Shift Keying (BPSK) and Quadrature Phase-Shift Keying (QPSK) modulation, the present invention has applicability to other modulation schemes.

Figure 1:
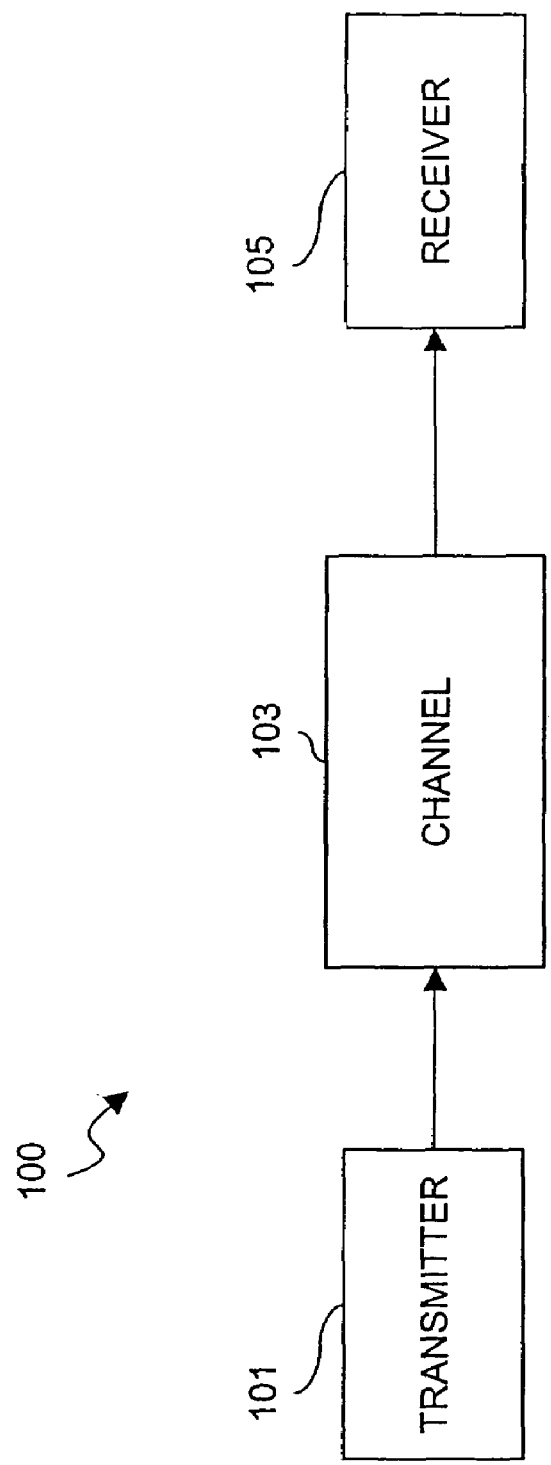
FIG. 1 is a diagram of a communication system configured to utilize space-time codes, according to an embodiment of the present invention.

FIG. 1 shows a diagram of a communication system configured to utilize space-time codes, according to an embodiment of the present invention. A digital communication system 100 includes a transmitter 101 that generates signal waveforms across a communication channel 103 to a receiver 105. In the discrete communication system 100, transmitter 101 has a message source that produces a discrete set of possible messages; each of the possible messages have a corresponding signal waveform. These signal waveforms are attenuated, or otherwise altered, by communications channel 103. One phenomena of interest is Intersymbol Interference (ISI), in which the channel 103 causes the overlap of signal pulses, resulting in the lost of signal orthogonality. As described with respect to the construction of space-frequency codes, the channel ISI characteristics are minimized. It is evident that receiver 105 must be able to compensate for the attenuation that is introduced by channel 103.

To assist with this task, transmitter 101 employs coding to introduce redundancies that safeguard against incorrect detection of the received signal waveforms by the receiver 105. To minimize the impact of the communication channel 103 on the transmission signals, channel coding is utilized. An algebraic design framework for layered and non-layered space-time codes in flat fading channels are in the following: A. R. Hammons Jr. and H. El Gamal. "On the theory of space-time codes for PSK modulation," *IEEE Trans. Info. Theory*, March 2000; and H. El Gamal and A. R. Hammons Jr. "The layered space-time architecture: a new prospective," *IEEE Trans. Info. Theory*, 1999; each of which is incorporated herein by reference in its entirety.

Based upon the algebraic design framework for space-time coding in flat fading channels in "On the Theory of Space-Time Codes for PSK Modulation," A. R. Hammons Jr. and H. El Gamal, *IEEE Trans. Info. Theory*, March 2000, the present invention extends this framework to design algebraic codes for multi-input multi-output (MIMO) frequency selective fading channels. The codes, according to the present invention, optimally exploit both the spatial and frequency diversity available in the channel. Two design approaches with different complexity-versus-diversity advantage trade-offs are considered. The first approach (referred to as "single carrier time domain design" approach or STC (space-time coding)), which is more fully described below in FIG. 3A, uses space-time coding and maximum likelihood (ML) decoding to exploit the multipath nature of the channel. The second approach utilizes an orthogonal frequency division multiplexing (OFDM) technique to transform the multi-path channel into a block fading channel (referred to as "OFDM based design" approach or SFC (space-frequency coding)); this approach is detailed in the discussion of FIG. 3B. The new algebraic framework, according to one embodiment of the present invention, is then used to construct space-frequency codes that optimally exploit the diversity available in the resulting block fading channel.

The two approaches, according to the present invention, differ in terms of decoder complexity, maximum achievable diversity advantage, and simulated frame error rate performance. The first approach requires relatively greater complexity at the receiver 105 over the second approach, in that the first approach combines algebraic space-time coding with maximum likelihood decoding to achieve the maximum possible diversity advantage in MIMO frequency selective channels to achieve the diversity advantage. As a result, this first approach has a relatively large trellis complexity, as required by the maximum likelihood receiver 105. The second approach utilizes an orthogonal frequency division multiplexing (OFDM) front-end to transform an intersymbol-interference (ISI) fading channel into a flat block fading channel.

Figure 2:
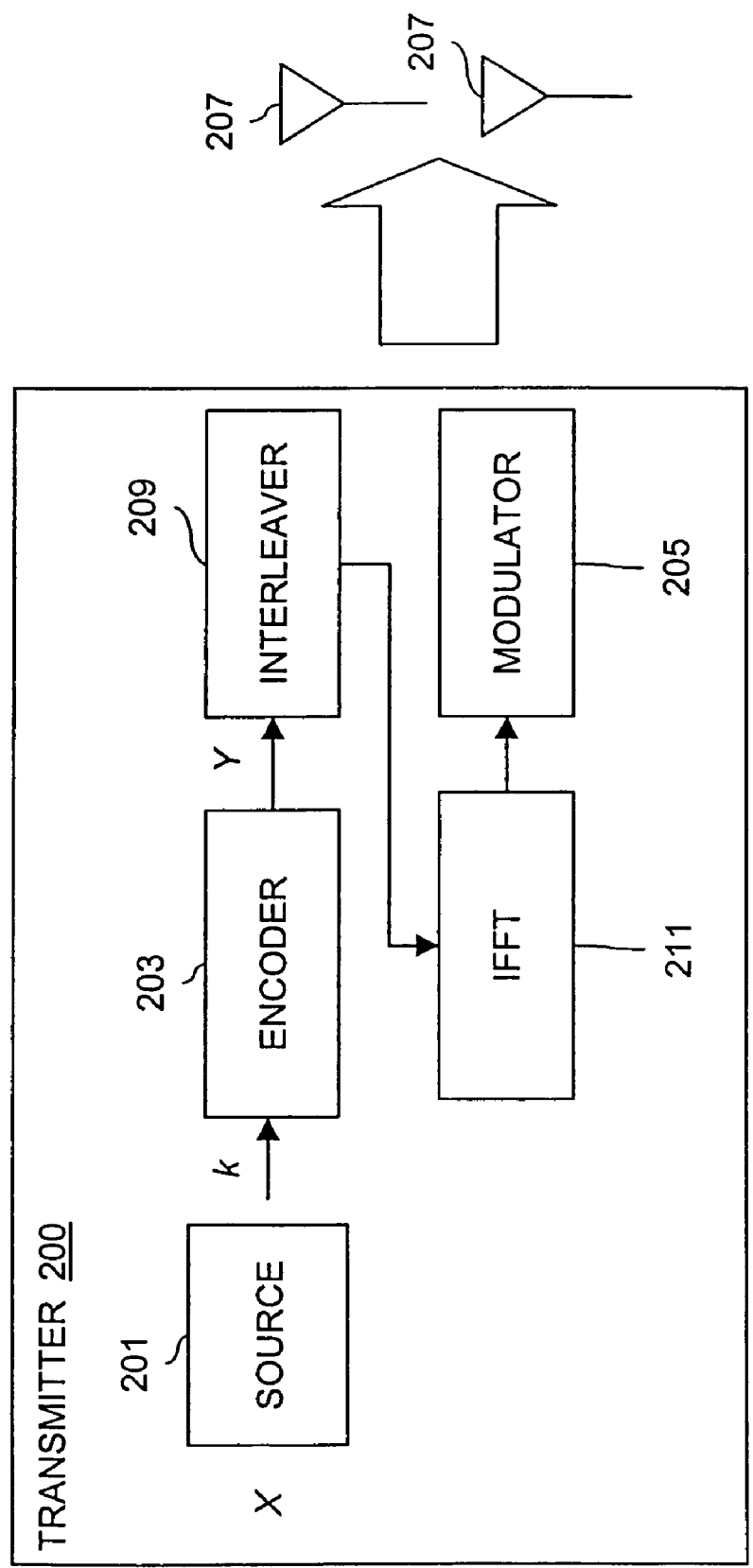
FIG. 2 is a diagram of an encoder that generates space-time codes, in accordance with an embodiment of the present invention.

FIG. 2 shows a diagram of an encoder that generates space-time codes, in accordance with an embodiment of the present invention. A transmitter 200 is equipped with a channel encoder 203 that accepts input from an information source 201 and outputs coded stream of higher redundancy suitable for error correction processing at the receiver 105 (FIG. 1). The information source 201 generates k signals from a discrete alphabet, X'. Encoder 203 generates signals from alphabet Y to a modulator 205. Modulator 205 maps the encoded messages from encoder 203 to signal waveforms that are transmitted to $L_t$ number of antennas 207, which emit these waveforms over the communication channel 103. Accordingly, the encoded messages are modulated and distributed among the $L_t$ antennas 207. The transmissions from each of the $L_t$ transmit antennas 207 are simultaneous and synchronous.

Figure 3A:
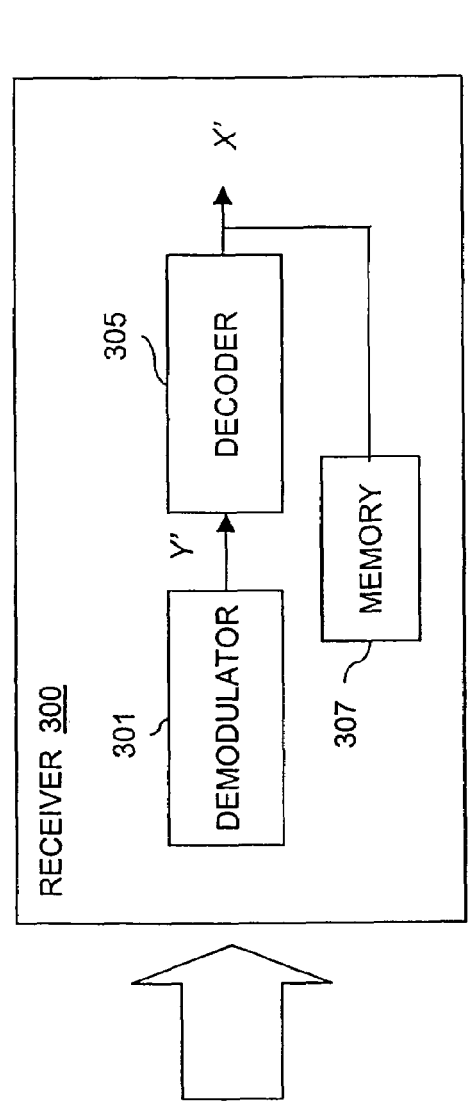
FIGS. 3A and 3B are diagrams of receivers that employ space-time codes and space-frequency codes, respectively, according to various embodiments of the present invention.

FIG. 3A shows a diagram of a decoder that decodes space-time codes, according to an embodiment of the present invention. At the receiving side, a receiver 300 includes a demodulator 301 that performs demodulation of received signals from transmitter 200. These signals are received at multiple antennas 303. The signal received at each antenna 303 is therefore a superposition of the $L_t$ transmitted signals corrupted by additive white Gaussian noise (AWGN) and the multiplicative intersymbol interference (ISI) fading. After demodulation, the received signals are forwarded to a decoder 305, which attempts to reconstruct the original source messages by generating messages, X'. Receiver 300, according to one embodiment of the present invention, has a memory 307 that stores channel state information (CSI) associated with the communication channel 103. Conventional communication systems typically require that CSI be available at both the transmitter and the receiver. By contrast, the present invention, according to one embodiment, does not require CSI at the transmitter 200, thus, providing a more robust design.

At the receiver 300, the signal $r_t^j$ received by antenna j at time t is given by $$r_t^j = \sqrt{E_s} \sum_{l=0}^{L_{ISI}-1} \sum_{i=1}^{L_t} a_l^{ij} s_{t-l}^i + n_t^j$$

where $\sqrt{E_s}$, is the energy per transmitted symbol; $a_l^{ij}$ is the complex path gain from transmit antenna i to receive antenna j for the lth path; $L_{ISI}$ is the length of the channel impulse response; $s_t^i$ is the symbol transmitted from antenna i at time t; $n_t^j$ is the additive white Gaussian noise sample for receive antenna j at time t. The noise samples are independent samples of circularly symmetric zero-mean complex Gaussian random variable with variance $N_0/2$ per dimension. The different path gains $a_l^{ij}$ are assumed to be statistically independent. A space-time code is defined to include an underlying error control code together with a spatial parsing formatter. Specifically, an $L_t \times l$ space-time code C of size M has an $(L_t l, M)$ error control code C and a spatial parser σ that maps each code word vector $\bar{c} \in C$ to an $L_t \times l$ matrix c whose entries are a rearrangement of those of $\bar{c}$. The space-time code C is said to be linear if both C and σ are linear.

It is assumed that the standard parser maps $$\bar{c}=(c_1^{(1)}, c_1^{(2)}, \ldots, c_1^{(L_t)}, c_2^{(1)}, c_2^{(2)}, \ldots, c_2^{(L_t)}, \ldots, c_l^{(1)}, c_l^{(2)}, \ldots, c_l^{(L_t)}) \in C$$

to the matrix $$c = \begin{bmatrix} c_1^1 & c_2^1 & \cdots & c_n^1 \\ c_1^2 & c_2^2 & \cdots & c_n^2 \\ \vdots & \vdots & \ddots & \vdots \\ c_1^{L_t} & c_2^{L_t} & \cdots & c_n^{L_t} \end{bmatrix}$$

The baseband code word f(c) is obtained by applying the modulation operator f on the components of c. This modulation operator maps the entries of c into constellation points from the discrete complex-valued signaling constellation Ω for transmission across the channel. In this notation, it is understood that $c_t^{(i)}$ is the code symbol assigned to transmit antenna i at time t and $s_t^{(i)} = f(c_t^{(i)})$.

The diversity advantage of a space-time code is defined as the minimum absolute value of the slope of any pairwise probability of error versus signal-to-noise ratio curve on a log-log scale. To maximize the spatial diversity advantage provided by the multiple transmit antenna in quasi-static flat fading MIMO channels, the following rank criterion is utilized [3][4]: for the baseband rank criterion, $d=\text{rank}(f(c)-f(e))$ is maximized over all pairs of distinct code words $c, e \in C$. Therefore full spatial transmit diversity is achieved if and only if rank $(f(c)-f(e))=L_t$ for all pairs of distinct code words $c, e \in C$. It should be noted that in the presence of $L_r$ receive antennas 303, the total diversity advantage achieved by this code is $L_t L_r$.

Space-time code constructions for frequency selective fading channels is based on the concept that in an ISI (intersymbol interference) environment with $L_{ISI}$ paths, a space-time system with $L_t$ transmit antennas 207 is equivalent to a space-time system operating in flat fading channel with $L_t L_{ISI}$ transmit antenna 207. However, in this equivalent model the code word matrices are restricted to have a certain special structure. This structure is captured in the following definition for the baseband code word matrix in ISI environments:

$$f(c)_{ISI} = \begin{bmatrix} f(c) & \underline{0} & \cdots & 0 \\ 0 & f(c) & \cdots & 0 \\ \vdots & \vdots & \ddots & \vdots \\ 0 & 0 & \cdots & f(c) \end{bmatrix}$$

where $c$ is the code word matrix as defined in (2) below, and $\underline{0}$ is the $L_t \times 1$ all zero vector. From the equivalent model, it is clear that in the frequency selective fading channels, space-time codes can be constructed to achieve $L_t L_{ISI}$ transmit diversity order. Therefore, the following baseband design criterion for space-time codes in the ISI channel is established: for ISI baseband rank criterion, $d = \text{rank}(f_{ISI}(c) - f_{ISI}(e))$ is maximized over all pairs of distinct code words $c, e \in C$. Full transmit diversity in this scenario is equal to $L_t L_{ISI}$, and is achieved if and only if $\text{rank}(f_{ISI}(c) - f_{ISI}(e)) = L_t L_{ISI}$ for all pairs of distinct code words $c, e \in C$.

Next, the binary rank criteria is developed; this criteria facilitate the construction of algebraic space-time codes for BPSK (Binary Phase-Shift Keying) and QPSK (Quadrature Phase-Shift Keying) modulated systems with an arbitrary number of transmit antennas 207 and channel impulse response lengths. A new code word matrix $c_{ISI}$ that captures the nature of the ISI channel is defined as:

$$c_{ISI} = \begin{bmatrix} c & \underline{0} & \cdots & 0 \\ 0 & c & \cdots & 0 \\ \vdots & \vdots & \ddots & \vdots \\ 0 & 0 & \cdots & c \end{bmatrix}$$

It is first observed that in general $$f(c_{ISI}) \neq f(c)_{ISI}, \quad (2)$$

since $$f(\underline{0}) \neq \underline{0}$$

However, it is noted the diversity advantage only depends on differences between code words rather than the code words themselves, and thus $$f(c_{ISI}) - f(e_{ISI}) = f(c)_{ISI} - f(e)_{ISI}$$

for any signaling constellation. The previous result is the key to the algebraic space-time constructions developed in this section.

Attention is now turned to the development of BPSK modulated codes, which may be utilized in the communication system 100 of FIG. 1. For BPSK modulation, elements in $c$ are drawn from the field $F=\{0,1\}$ of integers modulo 2. The modulation operator/maps the symbol $c_t^{(i)} \in F$ to the constellation point $s_t^{(i)} = f(c_t^{(i)}) \in \{-1,1\}$ according to the rule $f(c_t^{(i)}) = (-1)^{c_t^{(i)}}$. The binary rank criterion for full diversity space-time codes in ISI channels can thus be stated as follows.

With respect to the ISI channel binary rank criterion, it is assumed that $C$ is a linear $L_t \times l$ space-time code with underlying binary code $C$ of length $N=L_t l$ operating in an ISI channel with $L_{ISI}$ paths, where $l > L_t L_{ISI}$. Also, assuming that every non-zero code word $c$ corresponds to a matrix $c_{ISI}$ of full rank $L_t L_{ISI}$ over the binary field $F$, then, for BPSK transmission over the frequency selective quasi-static fading channel 103, the space-time code $C$ achieves full transmit diversity $L_t L_{ISI}$.

While the previous result was stated for full transmit diversity codes, it readily generalizes to any order of transmit diversity less than or equal to $L_t L_{ISI}$. The ISI channel binary rank criterion permits the use of a stacking construction that establishes an algebraic framework for the design of algebraic space-time codes for MIMO ISI fading channels. According to an embodiment of the present invention, the ISI channel stacking construction, $M_1, M_2, \ldots, M_{L_t}$ are binary matrices of dimension $k \times l, l \geq k$, and $C$ is the $L_t \times l$ space-time code of dimension $k$ including the code word matrices $$c = \begin{bmatrix} \underline{x} M_1 \\ \underline{x} M_2 \\ \vdots \\ \underline{x} M_{L_t} \end{bmatrix},$$

where $\underline{x}$ denotes an arbitrary $k$-tuple of information bits and $L_t < l$. The following is denoted $$M_{n,m} = [O_{L_t \times (m-1)} M_n O_{L_t \times (L_{ISI}+1-m)}],$$

where $O_{L_t \times (m-1)}$ is the $L_t \times (m-1)$ all zero matrix. Hence, $C$ satisfies the ISI channel binary rank criterion, and accordingly, for BPSK transmission over the quasi-static fading channel, achieves full transmit diversity $L_t L_{ISI}$, if and only if $M_{1,1}, M_{2,1}, \ldots, M_{L_t L_{ISI}}$ have the property that $\forall a_1, a_2, \ldots, a_{L_t} \in F$:

$M = a_1 M_{1,1} \oplus a_2 M_{2,1} \oplus \ldots \oplus a_{L_t L_{ISI}} M_{L_t L_{ISI}}$ is of full rank $k$ unless $a_1 = \ldots a_{L_t L_{ISI}} = 0$. It is noted that $$c_{ISI} = \begin{bmatrix} \underline{x} M_{1,1} \\ \underline{x} M_{1,2} \\ \vdots \\ \underline{x} M_{L_t, L_{ISI}} \end{bmatrix}.$$

The stacking construction is general and applies to block codes as well as trellis codes. An important example of the stacking construction is given by the class of binary convolutional codes. This class is important because it allows for a reasonable complexity maximum likelihood decoder. Let C be the binary, rate $1/L_t$, convolutional code having transfer function matrix [6]

$$G(D)=[g_1(D), g_2(D), \ldots, g_{L_t,1}(D), \ldots, g_{L_t,L_{ISI}}(D)],$$

then the natural space-time code C associated with C is defined to include the code word matrices $c(D)=G^T(D)x(D)$, where the polynomial $x(D)$ represents the input information bit stream. In other words, for the natural space-time code, the natural transmission format is adopted, in which the output coded bits generated by $g_i(D)$ are transmitted via antenna i. It is assumed the trellis codes are terminated by tail bits [3]. Thus, if $x(D)$ is restricted to a block of N information bits, then C is an $L_t \times (N+v)$ space-time code, where $v=\max_{1\leq i\leq L_t}\{\deg g_i(x)\}$ is the maximal memory order of the convolutional code C. The following is denoted $$G_{ISI}(D)=[g_{1,1}(D), g_{2,1}(D), \ldots, g_{L_t,1}(D), \ldots, g_{L_t,L_{ISI}}(D)]$$

where $g_{n,m}=D^{(m-1)}g_n$. The following characterizes the result of the performance of natural space-time convolutional codes in ISI channels.

The natural space-time code C associated with the rate $1/L_t$ convolutional code C satisfies the binary rank criterion, and thus achieves full transmit diversity for BPSK transmission in an ISI channel with $L_{ISI}$ paths, if and only if the transfer function matrix $G_{ISI}(D)$ of C has full rank $L_tL_{ISI}$ as a matrix of coefficients over F. This result stems from the observation that $$\sum_{1\leq i \leq L_t, 1\leq j \leq L_{ISI}} a_{i,j}g_{i,j}(D)x(D) = 0$$

for some $x(D) \neq 0$ iff $$\sum_{1\leq i \leq L_t, 1\leq j \leq L_{ISI}} a_{i,j}g_{i,j}(D) = 0.$$

This observation readily generalizes to recursive convolutional codes.

The above result extends to convolutional codes with arbitrary rates and arbitrary diversity orders. Since the coefficients of $G_{ISI}(D)$ form a binary matrix of dimension $L_tL_{ISI}\times(v+L_{ISI})$, and the column rank must be equal to the row rank, the result provides a simple bound as to how complex the convolutional code must be in order to satisfy the full diversity ISI channel binary rank criterion.

The maximum diversity order achieved by a space-time code based on an underlying rate $1/L_t$ convolutional code C with a maximal memory order v in a $L_{ISI}$ paths ISI channel is $v+L_{ISI}$. This bound shows that, for a fixed trellis complexity, increasing the number of antennas beyond $$L_t = \frac{v + L_{ISI}}{L_{ISI}}$$

will not result in an increase in the diversity advantage. This fact is supported by the results in Table 1, below, which lists the diversity advantage for BPSK algebraic space-time codes with optimal free distance for MIMO frequency selective fading channels:

TABLE 1

| $L_t$ | v | Connection Polynomials | d for $L_{ISI}=1$ | d for $L_{ISI}=2$ | d for $L_{ISI}=3$ | d for $L_{ISI}=4$ |
|---|---|---|---|---|---|---|
| 2 | 2 | 5, 7 | 2 | 4 | 5 | 6 |
|   | 3 | 64, 74 | 2 | 4 | 6 | 7 |
|   | 4 | 46, 72 | 2 | 4 | 6 | 8 |
|   | 5 | 65, 57 | 2 | 4 | 6 | 8 |
|   | 6 | 554, 744 | 2 | 4 | 6 | 8 |
| 3 | 3 | 54, 64, 74 | 3 | 5 | 6 | 7 |
|   | 4 | 52, 66, 76 | 3 | 6 | 7 | 8 |
|   | 5 | 47, 53, 75 | 3 | 6 | 8 | 9 |
|   | 6 | 554, 624, 764 | 3 | 6 | 9 | 10 |
| 4 | 4 | 52, 56, 66, 76 | 4 | 6 | 7 | 8 |
|   | 5 | 53, 67, 71, 75 | 4 | 7 | 8 | 9 |
| 5 | 5 | 75, 71, 73, 65, 57 | 5 | 7 | 8 | 9 |

Because the number of paths is not known a priori at the transmitter 200, it is desirable to construct space-time codes that achieve the maximum diversity order for arbitrary number of paths. This leads to the notion of universal space-time codes that combine the maximum spatial diversity with the ISI channel frequency diversity whenever available. Within the class of universal space-time codes with maximum diversity advantage, it is ideal to select the code with the maximum product distance, which measures the asymptotic coding achieved by the code [3][4].

Although BSPK modulation is discussed, it is recognized that the extension to QPSK modulation can be readily made. The ISI binary rank criterion and stacking construction for BPSK modulation can be generalized to obtain similar results for QPSK modulation. As a consequence of the QPSK ISI binary rank criterion and stacking construction, it is observed that the binary connection polynomials of Table 1 can be used to generate linear, $Z_4$-valued, rate $1/L_t$ convolutional codes whose natural space-time formatting achieves full spatial diversity $L_tL_{ISI}$ for QPSK modulation. More generally, any set of $Z_4$-valued connection polynomials with modulo 2 projections (shown Table 1) may be used. In most cases under consideration, the best performance was obtained from the lifted $Z_4$ codes constructed by replacing the zero coefficients by twos. This lifting produces the codes in Table 2, which lists $Z_4$ space-time codes for QPSK modulation in MIMO frequency selective fading channels.

TABLE 2

| $L_t$ | v | Connection Polynomials |
|---|---|---|
| 2 | 1 | 1 + 2D, 2 + D |
|   | 2 | $1 + 2D + D^2, 1 + D + D^2$ |
|   | 3 | $1 + D + 2D^2 + D^3, 1 + D + D^2 + D^3$ |
|   | 4 | $1 + 2D + 2D^2 + D^3 + D^4, 1 + D + D^2 + 2D^3 + D^4$ |
|   | 5 | $1 + D + 2D^2 + D^3 + 2D^4 + D^5, 1 + 2D + D^2 + D^3 + D^4 + D^5$ |

TABLE 2-continued

| $L_t$ | v | Connection Polynomials |
|---|---|---|
| 3 | 2 | $1 + 2D + 2D^2, 2 + D + 2D^2, 1 + D + 2D^2$ |
|  | 3 | $1 + D + 2D^2 + D^3, 1 + D + 2D^2 + D^3, 1 + D + D^2 + D^3$ |
|  | 4 | $1 + 2D + D^2 + 2D^3 + D^4, 1 + D + 2D^2 + D^3 + D^4, 1 + D + D^2 + D^3 + D^4$ |
|  | 5 | $1 + 2D + 2D^2 + D^3 + D^4 + D^5, 1 + 2D + D^2 + 2D^3 + D^4 + D^5, 1 + D + D^2 + D^3 + 2D^4 + D^5$ |
| 4 | 3 | $1 + 2D + 2D^2 + 2D^3, 2 + D + 2D^2 + 2D^3, 2 + 2D + D^2 + 2D^3, 2 + 2D + 2D^2 + D^3$ |
|  | 4 | $1 + 2D + D^2 + 2D^3 + D^4, 1 + D + 2D^2 + D^3 + D^4, 1 + D + 2D^2 + D^3 + D^4, 1 + D + D^2 + D^3 + D^4$ |
|  | 5 | $1 + 2D + D^2 + 2D^3 + D^4 + D^5, 1 + D + 2D^2 + D^3 + D^4 + D^5, 1 + D + D^2 + 2D^3 + 2D^4 + D^5,$<br>$1 + D + D^2 + D^3 + 2D^4 + D^5$ |
| 5 | 4 | $1 + 2D + 2D^2 + 2D^3 + 2D^4, 2 + D + 2D^2 + 2D^3 + 2D^4, 2 + 2D + D^2 + 2D^3 + 2D^4,$<br>$2 + 2D + 2D^2 + D^3 + 2D^4, 2 + 2D + 2D^2 + 2D^3 + D^4$ |
|  | 5 | $1 + D + D^2 + D^3 + 2D^4 + D^5, 1 + D + D^2 + 2D^3 + 2D^4 + D^5, 1 + D + D^2 + 2D^3 + D^4 + D^5,$<br>$1 + D + 2D^2 + D^3 + 2D^4 + D^5, 1 + 2D + D^2 + D^3 + 2D^4 + D^5$ |

The described single carrier time domain design approach requires the use of a relatively more complex maximum likelihood decoder 305 to account for the multi-input multi-output ISI nature of the channel 103. In an exemplary embodiment, this maximum likelihood decoder 305 can be realized using a Viterbi decoder with trellis complexity proportional to $2^{(L_{ISI}+v)}$ and $4^{(L_{ISI}+v)}$ for BPSK and QPSK modulations, respectively (wherein v is the maximal memory order of the underlying convolutional code).

If receiver complexity presents an issue, which is conceivable in certain applications, then a second design approach may be implemented. Such an approach uses space-frequency codes. In particular, to reduce the complexity of the receiver 300, an OFDM front-end 313 is utilized to transform the ISI channel into a flat, however, selective fading channel. The baseband signal assigned to each antenna 207 is passed through an inverse fast Fourier transform (IFFT) before transmission. The transmitted signal from antenna i at the nth interval is given by $$x_n^i = \sum_{k=0}^{N-1} s_k^i \exp\left(-j\frac{2\pi kn}{N}\right),$$

where N is block length. A cyclic prefix of length $L_{ISI}-1$ is added to eliminate the ISI between consecutive OFDM symbols. At the receiver end, the signal $y_n^j$ received by antenna j at time t is given by $$y_n^j = \sqrt{E_s} \sum_{l=0}^{L_{ISI}-1} \sum_{i=1}^{L_t} a_l^{ij} x_{t-1}^i + n_t^j$$

$$= \sqrt{E_s} \sum_{l=0}^{L_{ISI}-1} \sum_{i=1}^{L_t} \sum_{k=0}^{N-1} a_l^{ij} s_k^i \exp\left(-j\frac{2\pi k(n-1)}{N}\right) + n_t^j$$

The fast Fourier transform (FFT) operator is then applied to the received signal to yield $$r_t^j = \sum_{n=0}^{N-1} y_k^j \exp\left(-j\frac{2\pi nt}{N}\right)$$

$$= \sum_{i=1}^{L_t} \left(\sum_{l=0}^{L_{ISI}-1} a_l^{ij} \exp\left(-j\frac{2\pi nt}{N}\right)\right) s_t^i + N_t^j$$

$$= \sum_{i=1}^{L_t} H_t^{(ij)} s_t^i + N_t^j,$$

where $N_t^j$ are independent noise samples of circularly symmetric zero-mean complex Gaussian random variable with variance $N_0/2$ per dimension. The complex fading coefficients of the equivalent channel model $H_t^{ij}$ have the following auto-correlation function:

$$R(i_1 - i_2, j_1 - j_2, t_1 - t_2) = E\left(H_{t_1}^{(i_1,j_1)} H_{t_2}^{(i_2,j_2)*}\right)$$

$$= \delta(i_1 - i_2, j_1 - j_2) \sum_{l=0}^{L_{ISI}-1} \exp\left(-j\frac{2\pi l(t_1 - t_2)}{N}\right),$$

where $\delta(i,j)$ is the dirac-delta function. It is clear that the fading coefficients of the equivalent channel are spatially independent [6] and that $$R\left(0, 0, \frac{kN}{L_{ISI}}\right) = 0 \text{ for } k = 1, 2, \ldots, L_{ISI} - 1.$$

This observation suggests that the equivalent fading channel can be approximated by the piece-wise constant block fading channel. In this model the code word encompasses $L_{ISI}$ fading blocks. It is assumed that the complex fading gains are constant over one fading block, but are independent from block to block. Another type of receiver may be utilized in the event that receiver complexity presents a key design concern, as shown in FIG. 3B.

Figure 3B:
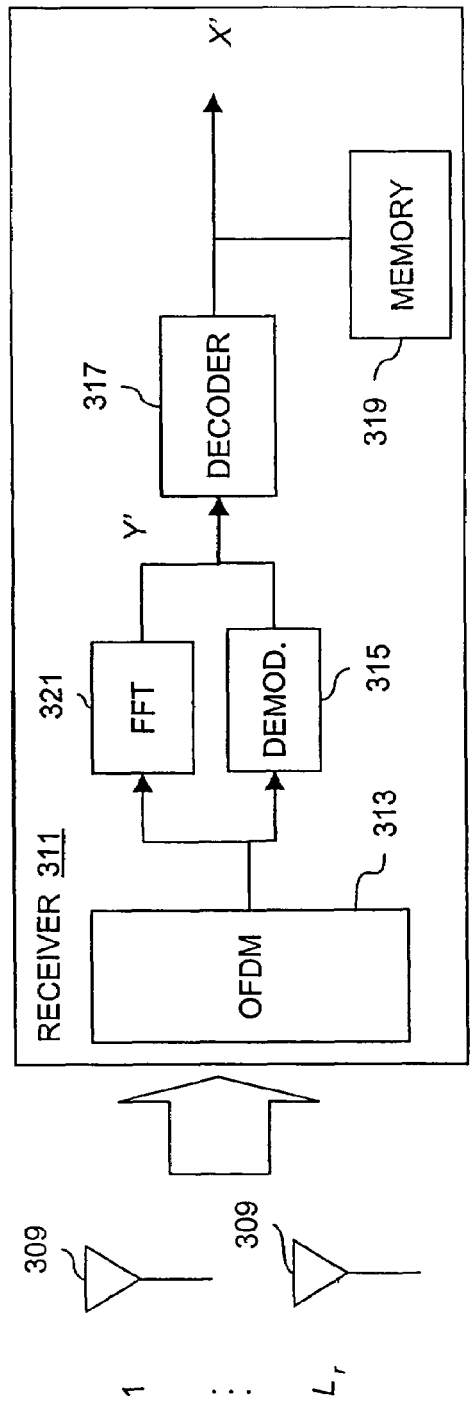

FIG. 3B shows a diagram of a receiver that employs space-frequency codes, according to an embodiment of the present invention. As with receiver 300 of the space-time code approach, receiver 311 processes signals via antennas 309 and includes a demodulator 315, a decoder 317, and a memory 319. Unlike receiver 300, receiver 311 employs an OFDM front-end 313, and includes a fast Fourier transform (FFT) logic 321 that may operate in parallel with the demodulator 315.

The design of space-frequency codes for the OFDM based design approach is described below. These space-frequency codes optimally exploit both spatial and frequency-selective diversity available in the multi-input-multi-output (MIMO) block fading channel. As in the single carrier time domain design approach, attention is focused on trellis based codes because of the availability of reasonable complexity ML decoders. For the purpose of explanation, the discussion pertains to BPSK modulated systems; however, it is recognized by one of ordinary skill in the art that QPSK codes can be obtained by lifting the BPSK codes, as described previously.

The general case in which C is a binary convolutional code of rate $k/L_t L_{ISI}$ is considered. The encoder 203 processes k binary input sequences $x_1(t), x_2(t), \ldots, x_k(t)$ and produces $L_t L_{ISI}$ coded output sequences $y_1(t), y_2(t), \ldots, y_{L_t L_{ISI}}(t)$, which are multiplexed together to form the output code word. The encoder action is summarized by the following matrix equation $$Y(D) = X(D)G(D),$$

where $Y(D) = [Y_1(D) Y_2(D) \ldots Y_{L_t L_{ISI}}(D)]$, $X(D) = [X_1(D) X_2(D) \ldots X_k(D)]$, and $$G(D) = \begin{bmatrix} G_{1,1}(D) & G_{1,2}(D) & \cdots & G_{1,L_t L_{ISI}}(D) \\ G_{2,1}(D) & G_{2,2}(D) & \cdots & G_{1,L_t L_{ISI}}(D) \\ \vdots & \vdots & \ddots & \vdots \\ G_{k,1}(D) & G_{k,2}(D) & \cdots & G_{k,L_t L_{ISI}}(D) \end{bmatrix}$$

The natural space-time formatting of C is such that the output sequence corresponding to $Y_{(m-1)L_t+l}(D)$ is assigned to the $l^{th}$ transmit antenna in the $m^{th}$ fading block. The algebraic analysis technique considers the rank of matrices formed by concatenating linear combinations of the column vectors $$F_l(D) = \begin{bmatrix} G_{1,l}(D) \\ G_{2,l}(D) \\ \vdots \\ G_{k,l}(D) \end{bmatrix}$$

G is defined to be the set of binary full rank matrices $\{G:G=[g_{i,j}]_{L_t \times L_t}\}$ resulting from applying any number of simple row operations to the identity matrix $I_{L_t}$; and $\forall G_1 \in G$, $1 \leq i \leq L_t, 1 \leq i \leq L_{ISI}$, $$R_i^{(G_m,m)}(D) = [g_{i,1}(m)I_k, g_{i,2}(m)I_k, \ldots, g_{i,L_t}(m)I_k] \begin{bmatrix} F_{(m-1)L_t+1}(D) \\ F_{(m-1)L_t+2}(D) \\ \vdots \\ F_{mL_t}(D) \end{bmatrix}$$

Accordingly, the following algebraic construction for BPSK space-frequency convolutional codes results. In a MIMO OFDM based communication system with $L_t$ transmit antennas 207 operating over a frequency selective block fading channel with $L_{ISI}$ blocks, C denotes the space-frequency code that includes the binary convolutional code C, whose $k \times L_t L_{ISI}$ transfer function matrix is $G(D)=[F_1(D) \ldots F_{L_t L_{ISI}}(D)]$ and the spatial parser σ in which the output $Y_{(m-1)L_t+1}(D)=X(D)F_{(m-1)L_t+1}(D)$ is assigned to antenna 1 in fading block m. Then, for BPSK transmission, C achieves d levels of transmit diversity if d is the largest integer such that $$\forall G_1 \in \mathcal{G}, \ldots, G_{L_{ISI}} \in \mathcal{G},$$
$$0 \leq m_1 \leq \min(L_t, L_{ISI}L_t - d + 1), \ldots, 0 \leq$$
$$m_{L_{ISI}} \leq \min(L_t, L_{ISI}L_t - d + 1), \text{ and}$$
$$\sum_{i=1}^{L_{ISI}} m_i = L_{ISI}L_t - d + 1,$$

$$R_{m_1,\ldots,mL_{ISI}}^{(G_1,\ldots,G_{L_{ISI}})}(D) = \left[ R_0^{(G_1,1)}(D), \ldots, R_{m_1}^{(G_1,1)}(D), R_0^{(G_2,2)}(D), \ldots, \right.$$
$$\left. R_{m_2}^{(G_2,2)}(D), \ldots, R_{m_{L_{ISI}}}^{(G_{L_{ISI}},L_{ISI})}(D) \right]$$

has a rank k over the space of all formal series.

The above result allows for constructing convolutional space-frequency codes that realize the optimum tradeoff between transmission rate and diversity order for BPSK modulation with arbitrary coding rate, number of transmit antenna, and number of fading blocks. It is readily seen that this framework encompasses as a special case rate 1/n' convolutional codes with bit or symbol interleaving across the transmit antennas and frequency fading blocks.

Similar to the space-time coding approach, rate $1/L_t$ convolutional codes are considered, wherein the same transmission throughput is achieved. The output sequence from the ith arm $Y_i(D)$ is assigned to the ith antenna. The input assigned to each antenna 207 is then distributed across the different fading blocks using a periodic bit interleaver 209. The design of interleaver 209 depends largely on whether the number of resolvable paths is available at the transmitter 200. In the case in which this information is available at the transmitter 200, the interleaver mapping function π is defined as $$\pi(i) = \left\lfloor \frac{i}{L_{ISI}} \right\rfloor + \frac{N}{L_{ISI}} (i)_{L_{ISI}},$$

where $(\ )_m$ refers to the modulo m operation, $0 \leq i \leq N-1$, and N is the code word length, which is assumed to be a multiple of $L_{ISI}$.

In the absence of the prior information on the number of resolvable paths in the channel 103, an interleaving scheme that is capable of exploiting all the frequency diversity, whenever available, for an arbitrary unknown number of paths is needed. In the special case in which the number of paths is restricted to $L_{ISI}=2^r$ (for any arbitrary integer r) and the maximum possible number of paths $L_{ISI}^{(max)}$ is known at the transmitter 200, the following construction for the universal interleaving map is provided:

$$\pi(i) = \sum_{k=0}^{\log_2(L_{ISI}^{(max)})} a_k \frac{N}{2^{k+1}} + \left\lfloor \frac{i}{L_{ISI}^{(max)}} \right\rfloor,$$

-continued $$a_k = \left( \frac{(i)L_{ISI}^{(max)} - \sum_{j=0}^{k-1} a_j 2^j}{2^k} \right)$$

This interleaving scheme distributes the input sequence periodically among the $L_{ISI}$ fading blocks for any $L_{ISI}=2^r$ and $L_{ISI} \leq L_{ISI}^{(max)}$. In practical applications, $L_{ISI}^{(max)}$ may be chosen to be larger than the maximum number of resolvable paths expected in this particular application, and hence, the transmitter 200 does not need feedback from the receiver 300. This does not result in any loss of performance. If the number of paths is not a power of two, then the diversity advantage is lower bounded by that achieved with the number of paths equal to $L_{ISI}^{(approx)}$) such that $L_{ISI}^{(approx)}=2^r<L_{ISI}$.

Table 3 shows the diversity advantage that is achieved by the optimal free distance codes when used as space-frequency codes in this scenario. Specifically, Table 3 lists the diversity advantage for BPSK algebraic space-frequency codes with optimal free distance for MIMO frequency selective fading channels.

TABLE 3

| $L_t$ | v | Connection Polynomials | d for $L_{ISI}=1$ | d for $L_{ISI}=2$ | d for $L_{ISI}=3$ | d for $L_{ISI}=4$ |
|---|---|---|---|---|---|---|
| 2 | 2 | 5, 7 | 2 | 4 | 5 | 6 |
|   | 3 | 64, 74 | 2 | 4 | 6 | 7 |
|   | 4 | 46, 72 | 2 | 4 | 6 | 8 |
|   | 5 | 65, 57 | 2 | 4 | 6 | 8 |
|   | 6 | 554, 744 | 2 | 4 | 6 | 8 |
| 3 | 3 | 54, 64, 74 | 3 | 4 | — | — |
|   | 4 | 52, 66, 76 | 3 | 3 | 5 | — |
|   | 5 | 47, 53, 75 | 3 | — | — | — |
|   | 6 | 554, 624, 764 | 3 | — | — | — |
| 4 | 4 | 52, 56, 66, 76 | 4 | — | — | — |
|   | 5 | 53, 67, 71, 75 | 4 | — | — | — |
| 5 | 5 | 75, 71, 73, 65, 57 | 5 | — | — | — |

While, the codes in Table 3 may not realize the maximum possible diversity advantage under all circumstances, these codes a compromise between the diversity advantage and coding gain.

The OFDM based approach addresses the need for a lower complexity maximum likelihood receiver 300. This approach recognizes the fact that the maximum likelihood decoder 317 complexity in the OFDM approach does not increase exponentially with the number of resolvable paths, contrary to the space-time coding approach. It should be noted that this does not mean, however, that complexity of the decoder 317 does not depend on the number of paths. As shown in Table 3, as the number of paths increases, the codes with larger constraint lengths are needed to efficiently exploit the diversity available in the channel 103. Unlike the space-time coding approach, it is possible to trade diversity advantage for a reduction in complexity by choosing a code with a small constraint length. This trade-off is not possible in the space-time coding approach because, irrespective of the constraint length of the code, the complexity of the (ML) decoder 305 grows exponentially with the number of resolvable paths. The OFDM based approach, however, provides a relatively lower diversity advantage over the space-time coding approach.

The maximum transmit diversity advantage achieved in a BPSK OFDM MIMO wireless system with $L_t$ transmit antennas 207 and $L_{ISI}$ resolvable paths/antenna supporting a throughput of 1 bps/Hz is $L_{ISI}(L_t-1)+1$. It is clear that the maximum diversity advantage under this approach is lower as compared to the space-time coding approach (i.e, $L_t L_{ISI}$). The results in Tables 1 and 3 compare the diversity advantage achieved by space-time codes and space-frequency codes for different values of $L_t$ and $L_{ISI}$. As will be evident from the discussion below, this loss in diversity advantage may not always lead to a performance loss in the frame error rate range of interest.

FIGS. 4A-4H show graphs of simulation results of the channel codes, in accordance with the various embodiments of the present invention. Specifically, these figures show the simulated frame error rate performance results for the two coding approaches, concentrating on the codes presented in Tables 1, 2, and 3. In all cases, the frame length corresponds to 100 simultaneous transmissions from all antennas 207. Joint maximum likelihood decoding and equalization that accounts for the ISI nature of the channel is assumed at the receiver (e.g., 300 and 311). In most cases, the simulated frame error rates were restricted to less than 1% because of the practical significance of this range and to limit the simulation time.

FIGS. 4A-4G report the performance of the two proposed approaches in BPSK systems with different numbers of transmit antennas $L_t$, receive antennas $L_r$, resolvable paths $L_{ISI}$, and receiver trellis complexity. The number of states in the figures represents the maximum likelihood decoder trellis complexity. For the OFDM approach, this number is equal to the number of states in the underlying convolutional codes; however, for the space-time coding approach, this number accounts for the additional complexity dictated by the ISI nature of the channel. In the figures, the single carrier approach with space-time coding is referred to as (STC), whereas the OFDM approach with space-frequency coding is referred to as (SFC).

Figure 4A:
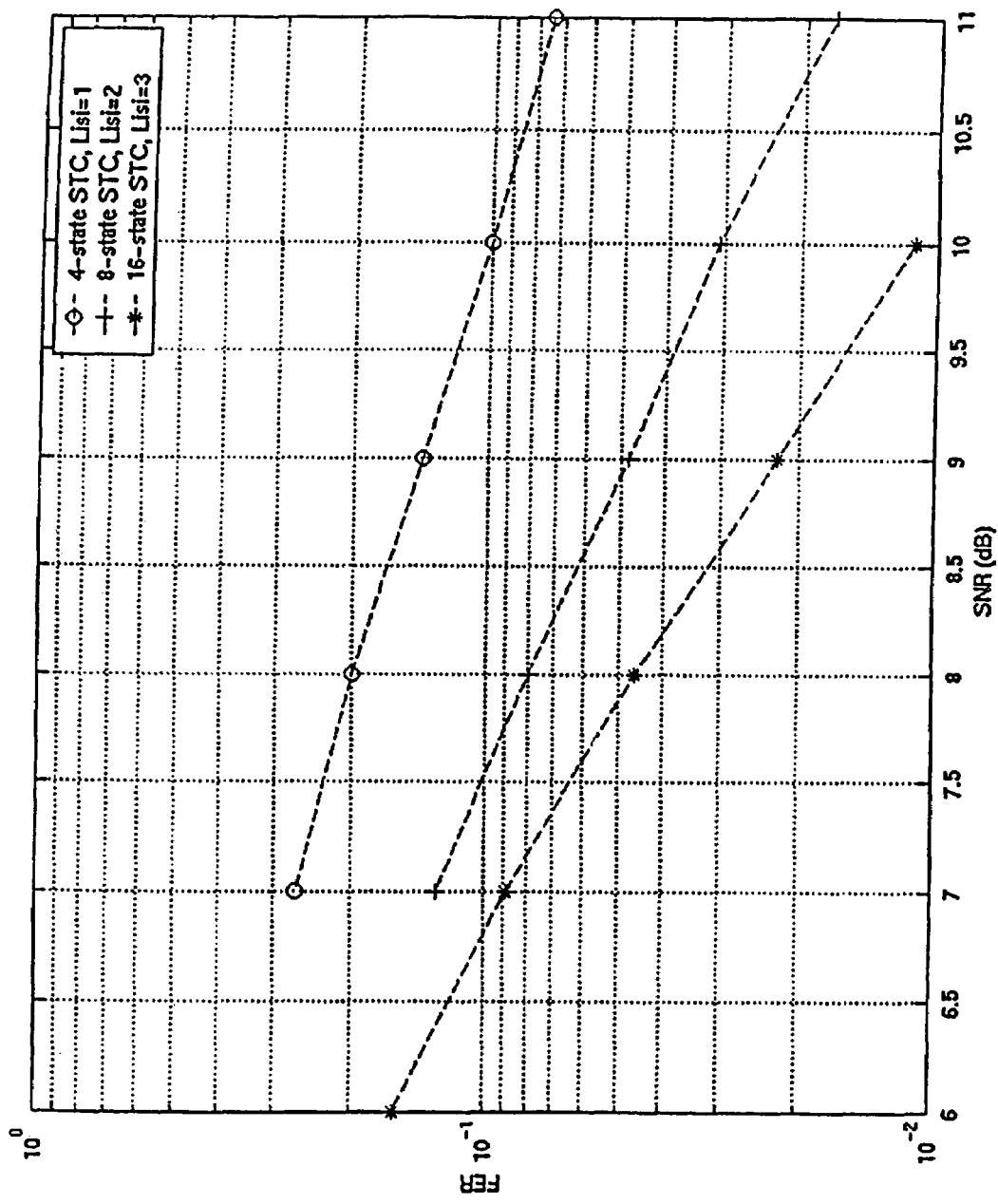
FIGS. 4A-4G are graphs of simulation results of the space-time codes and space-frequency codes, according to the embodiments of the present invention.
Figure 4B:
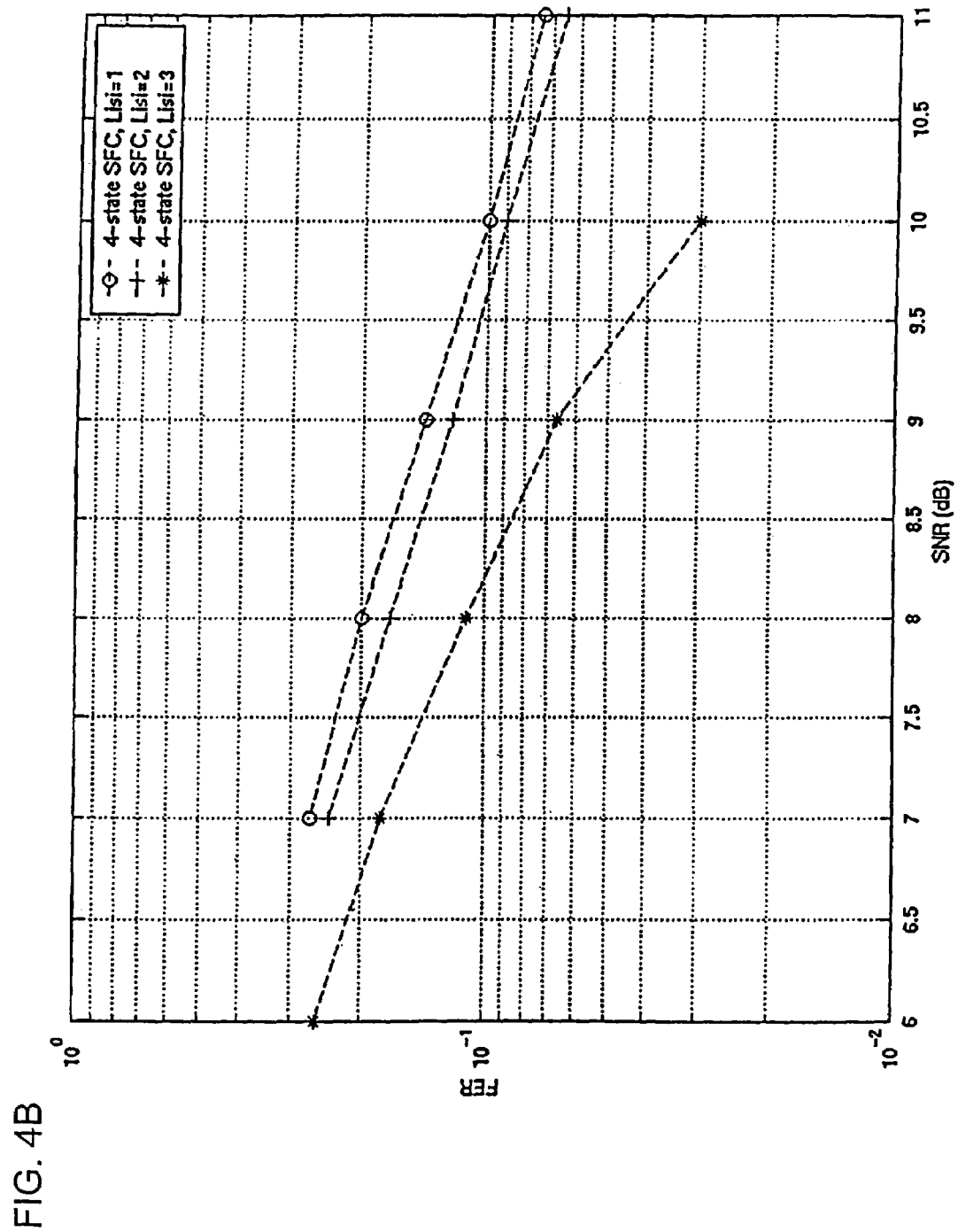
Figure 4C:
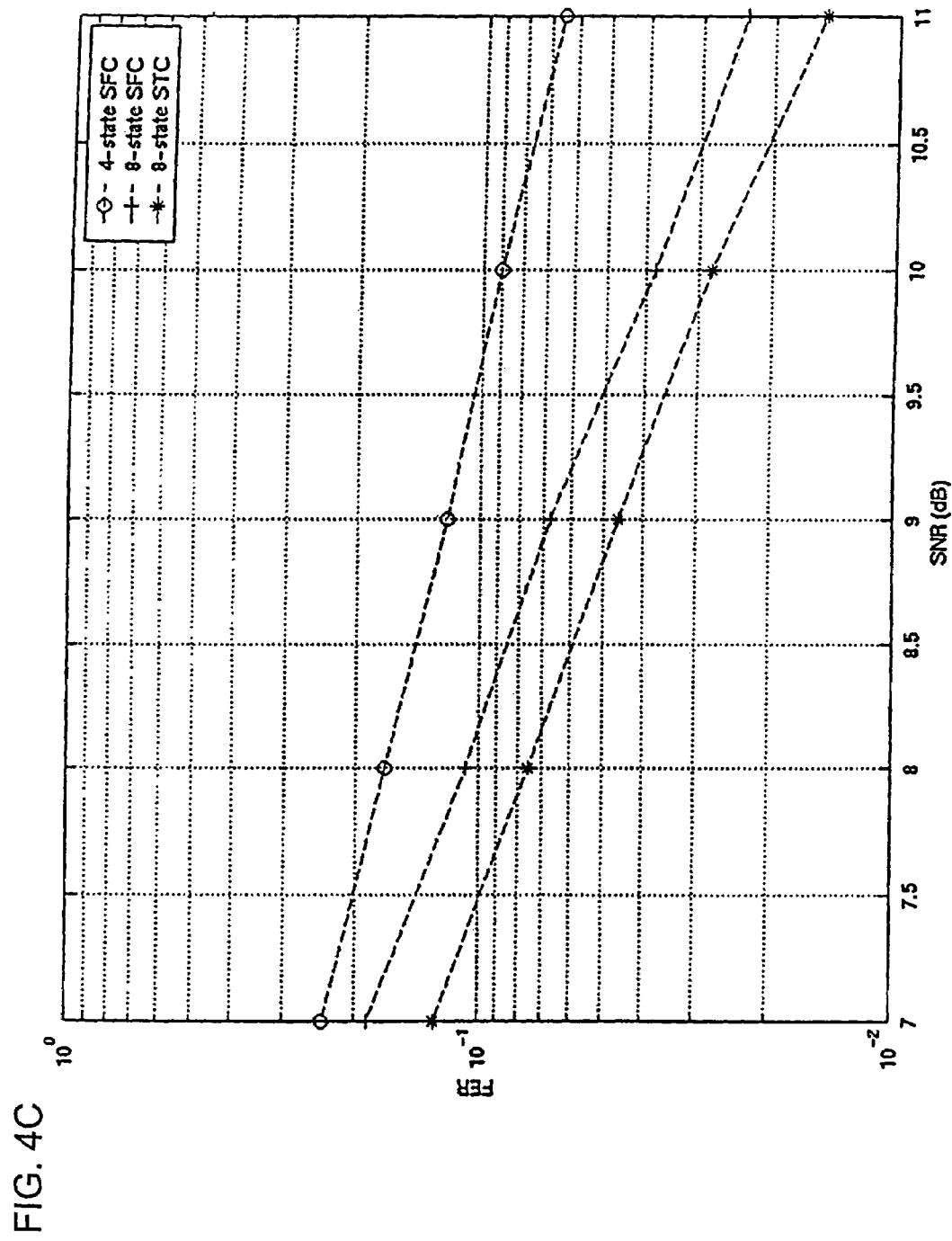
Figure 4D:
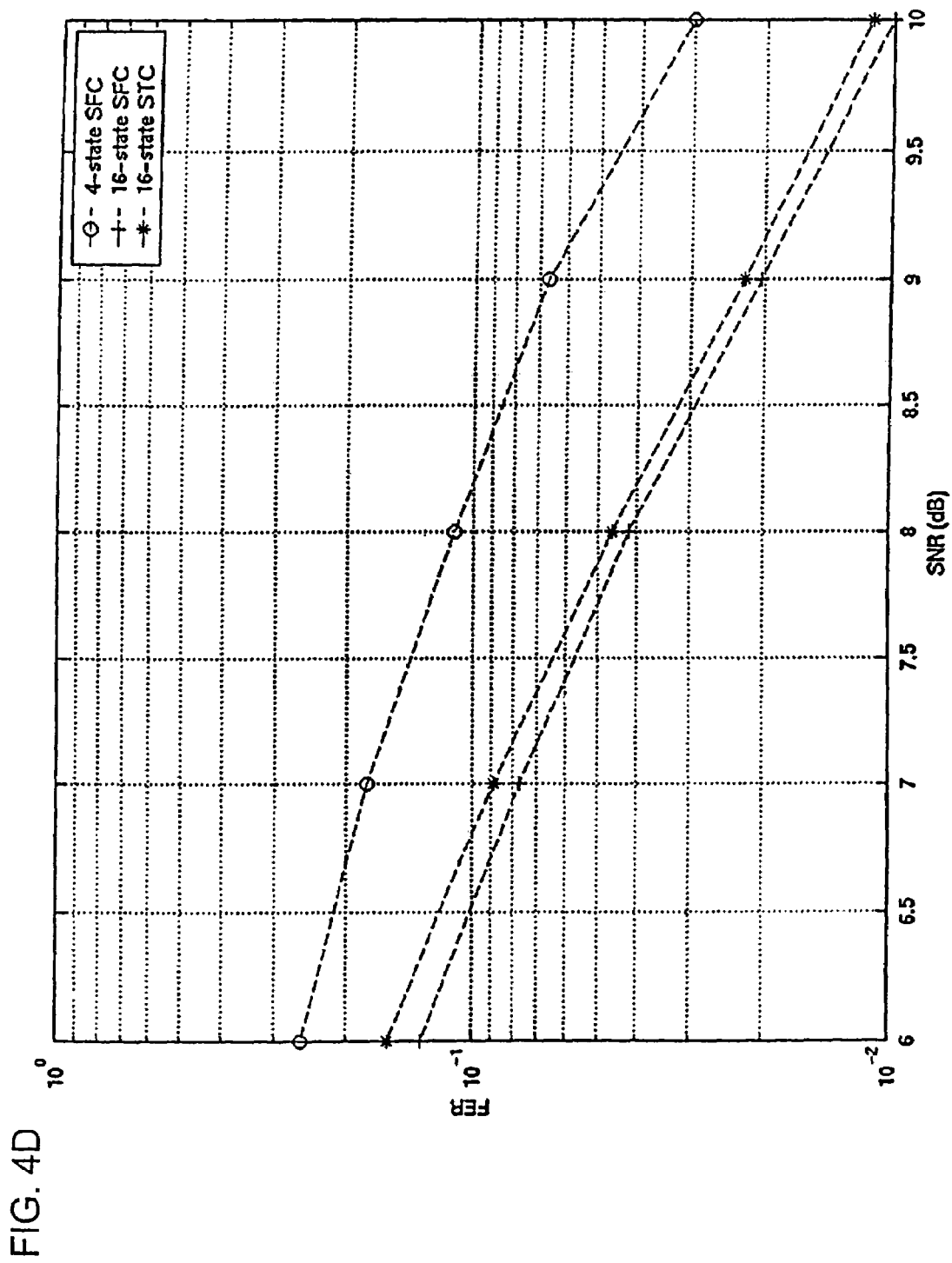
Figure 4E:
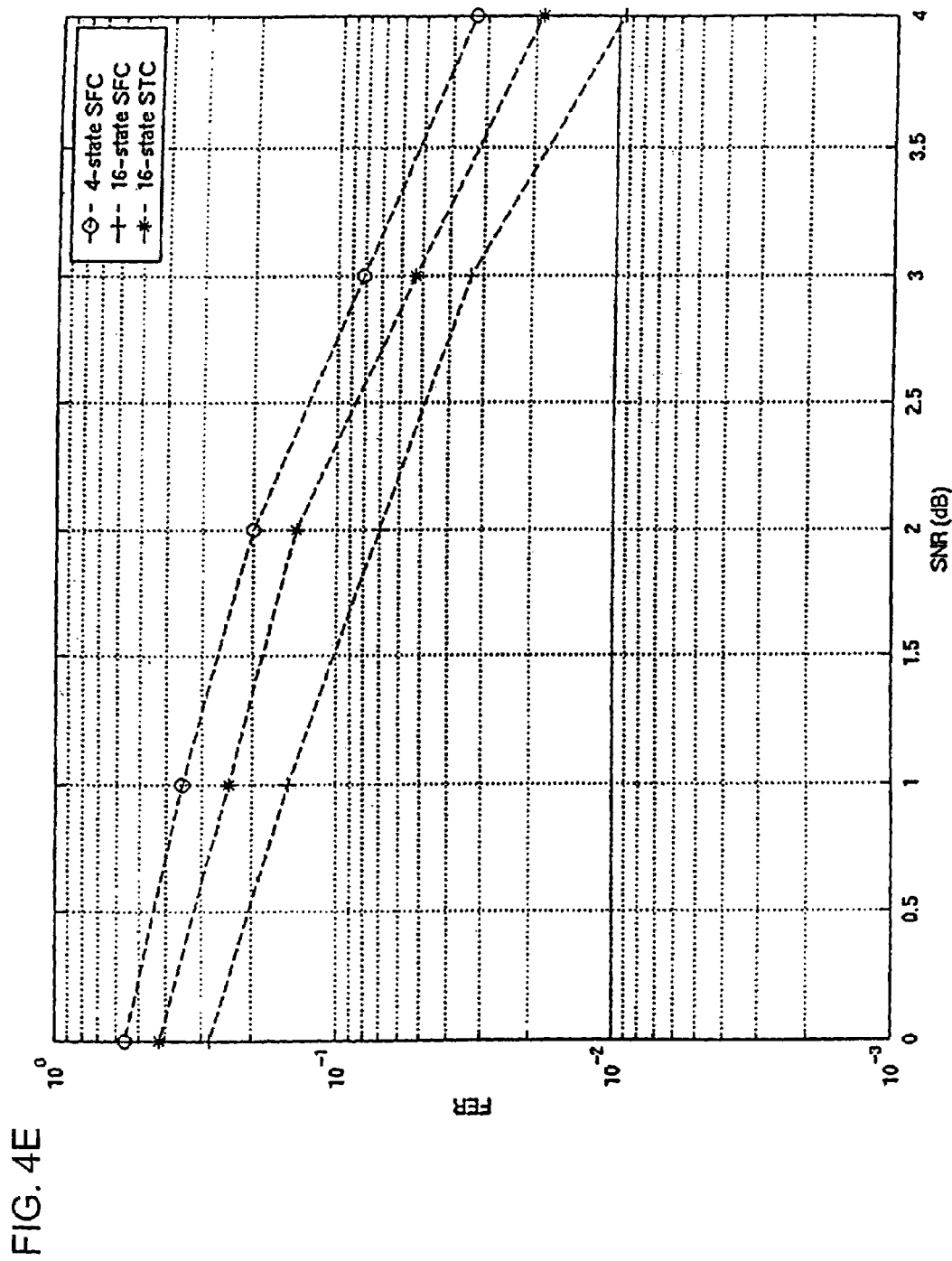
Figure 4F:
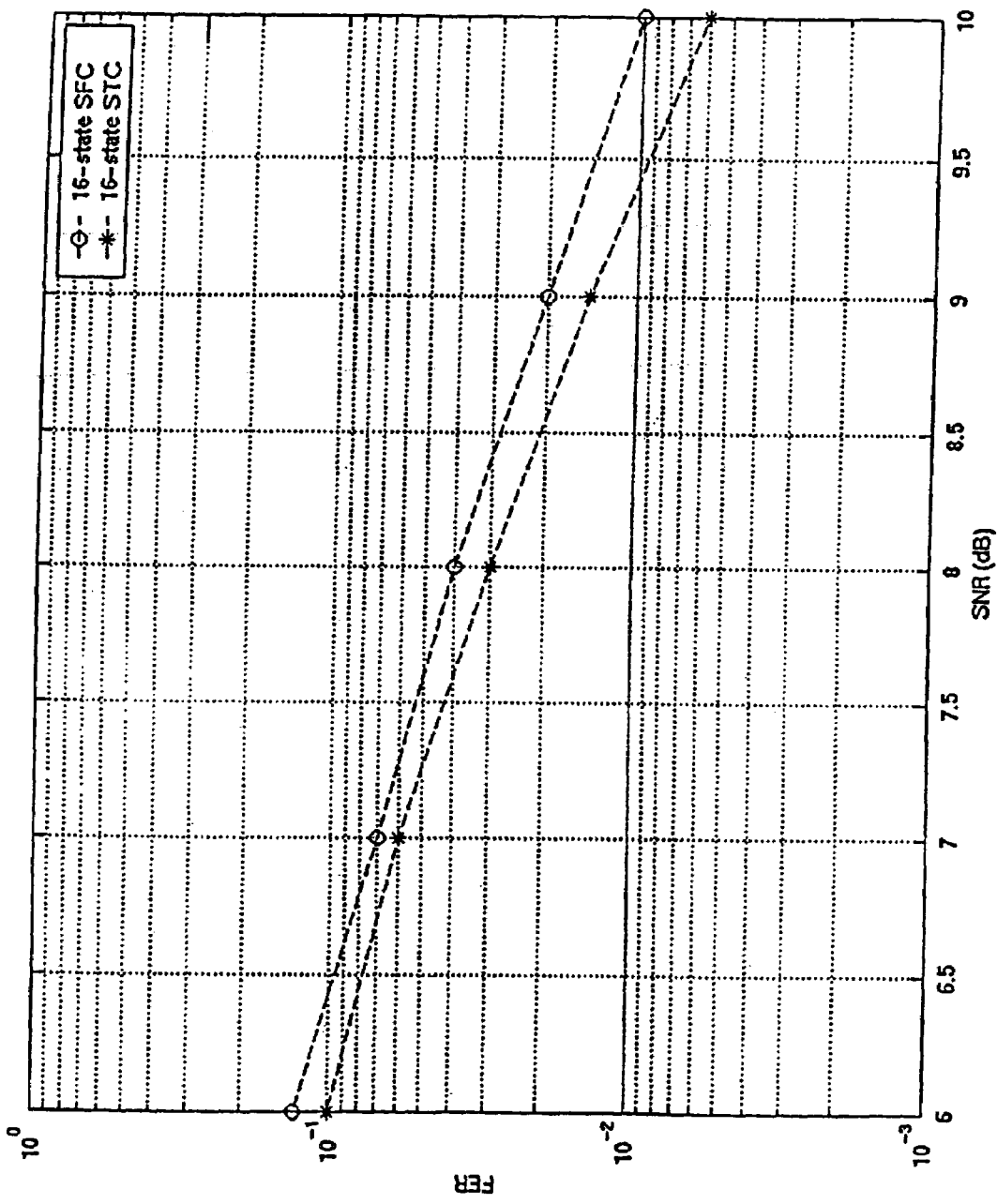

In FIGS. 4A and 4B, the gain in performance of the two approaches are shown with respect to an increasing number of resolvable paths. In the single carrier approach, this improvement provides a concomitant increase in receiver complexity as the number of states in the maximum likelihood receiver grows exponentially with the number of resolvable paths. In contrast, for the space-frequency coding approach, the performance improvement does not entail any increase in complexity. It is noted that the improvement in performance in the SFC approach is marginal when $L_{ISI}$ increases from one to two because, as shown in Table 1; the diversity advantage of the 4-state code used is the same in both scenario.

FIGS. 4C-4F provides a comparison between the STC and SFC approaches. It is shown that when the same code is used in both schemes, the STC approach always provides a gain in performance, however, at the expense of higher receiver complexity. Whereas, if the receiver complexity is fixed in both approaches, the SFC approach sometimes offers better performance. This may seem in contrary to the intuition based on the superiority of the STC approach in terms of diversity advantage; this seeming contradiction can be attributed to two reasons. First, the same receiver complexity allows the SFC approach to utilize more sophisticated codes that offer larger coding gains. Second, the effect of the STC superior diversity advantage may only become apparent at significantly larger signal-to-noise ratios. This observation, however, indicates that the SFC approach may yield superior performance in some practical applications.

Figure 4G:
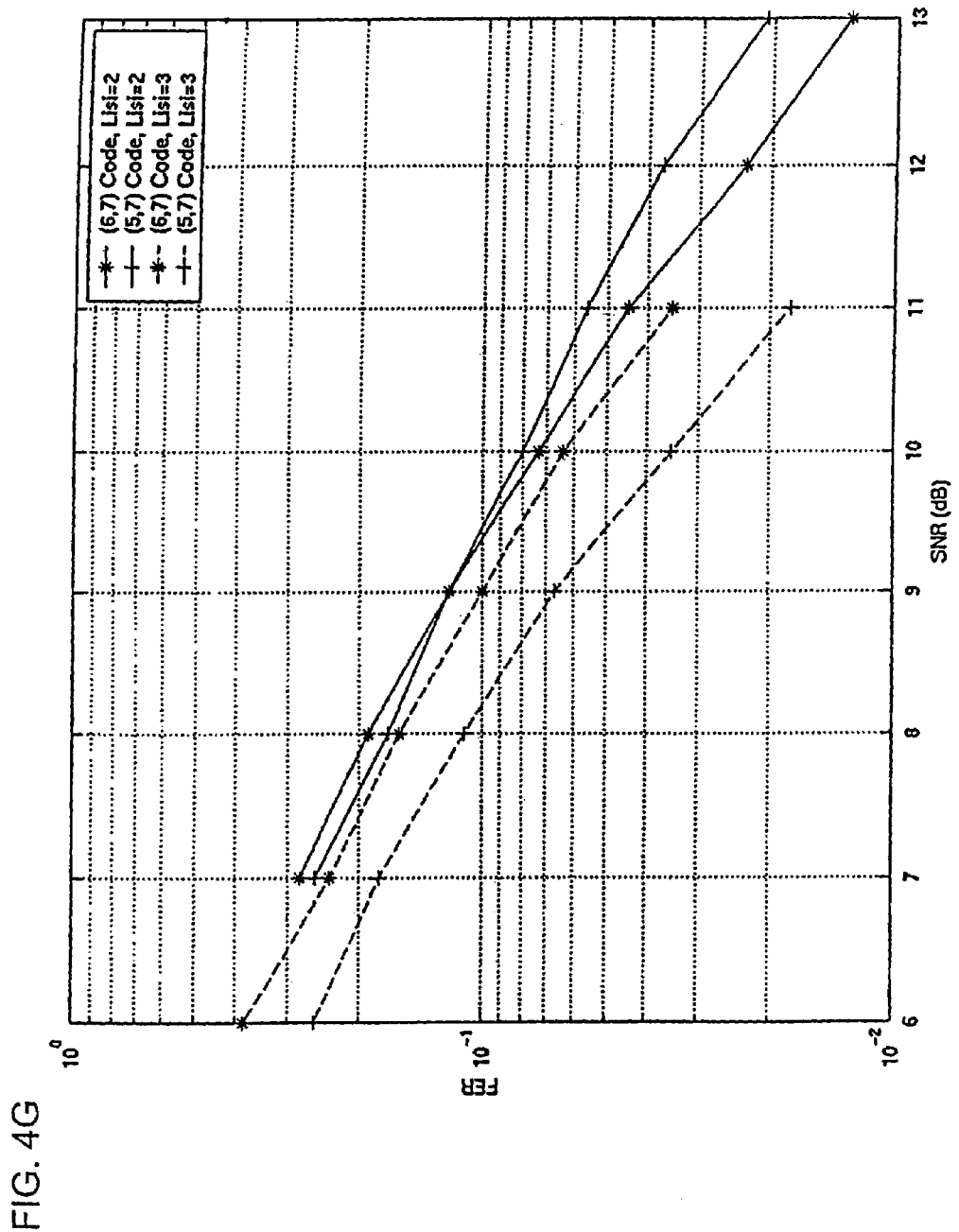

FIG. 4G highlights the importance of careful design in optimizing the diversity advantage. In this figure, the 4-state (5,7) optimal free distance SFC is compared with the 4-state (6,7) in a system with $L_t=2$, $L_r=1$, and $L_{ISI}=2,3$. As reported in Table 1, the (5,7) code achieves d=2,3 for $L_{ISI}=2,3$, respectively. Whereas, the (6,7) code achieves d=3 in both codes; it is noted that in the $L_{ISI}$, d=3 is the maximum possible diversity advantage for this throughput. As shown in the figure, for the $L_{ISI}$=2 case, the superior diversity advantage of the (6,7) is apparent in the steeper frame error rate curve slope. This results in a gain of about 1 dB at 0.01 frame error rate. On the other hand, for the $L_{ISI}$=3 case, it is shown that the (5,7) code exhibits a superior product distance that accounts for about 1 dB gain compared with the (6,7) code.

Figure 5:
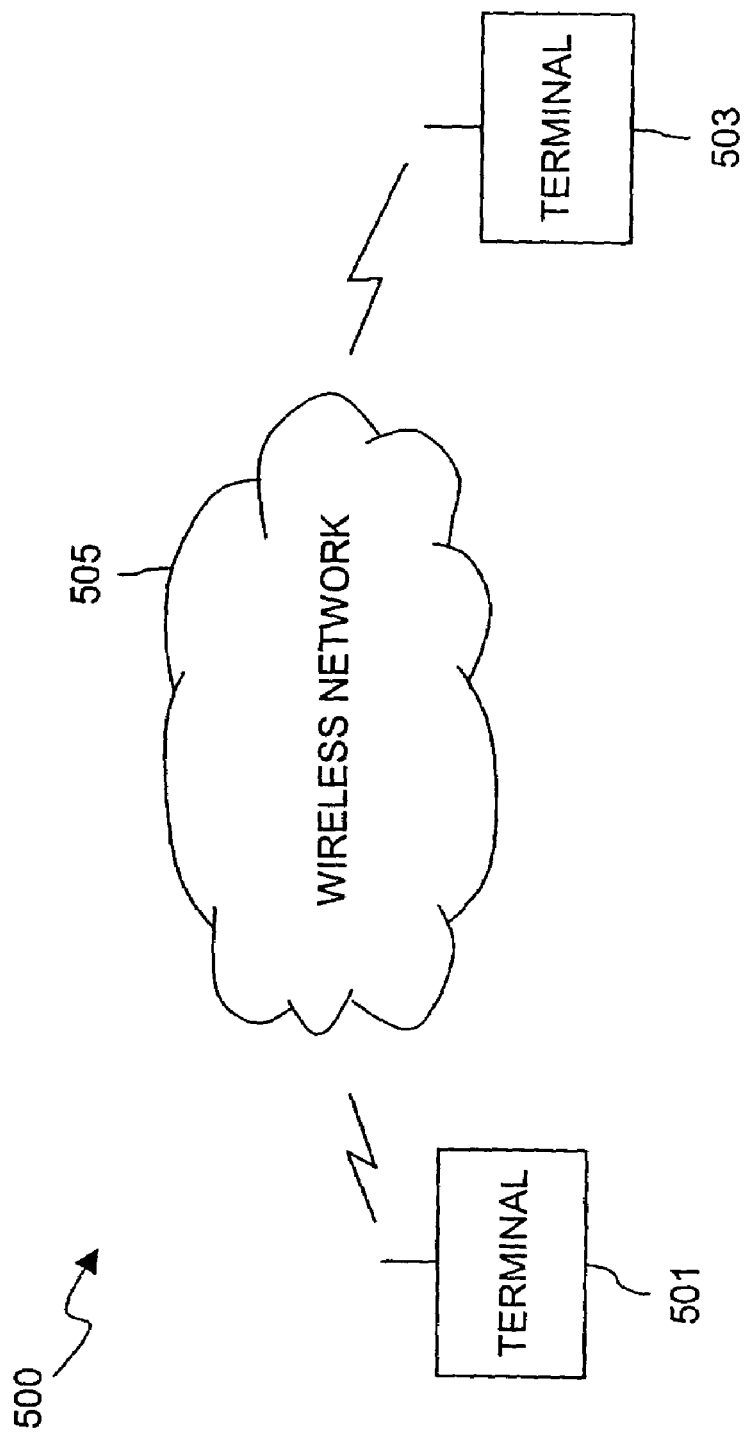
FIG. 5 is a diagram of a wireless communication system that is capable of employing the space-time codes and space-frequency codes, according to embodiments of the present invention.

The above construct has applicability in a number of communication systems; for example, the developed channel codes can be deployed in a wireless communication, as seen in FIG. 5.

FIG. 5 shows a diagram of a wireless communication system that utilizes the channel codes, according to the various embodiments of the present invention. In a wireless communication system 500, multiple terminals 501 and 503 communicate over a wireless network 505. Terminal 501 is equipped with an encoder 203 (as shown in FIG. 2) that generates space-time or space-frequency codes. Terminal 501 also includes multiple transmit antennas 207 (as shown in FIG. 2). In this example, each of the terminals 501 and 503 are configured to encode and decode the space-time codes; accordingly, both of the terminals 501 and 503 possess the transmitter 200 and receiver 300. However, it is recognized that each of the terminals 501 and 503 may alternatively be configured as a transmitting unit or a receiving unit, depending on the application. For example, in a broadcast application, terminal 501 may be used as a head-end to transmit signals to multiple receiving terminals (in which only receiving terminal 503 is shown). Consequently, terminal 503 would only be equipped with a receiver 300. Alternatively, each of the terminals 501 and 503 may be configured to operate using space-frequency codes. As mentioned previously, the choice of space-time codes versus space-frequency codes depends largely on the trade-off between receiver complexity and the desired diversity advantage.

Figure 6:
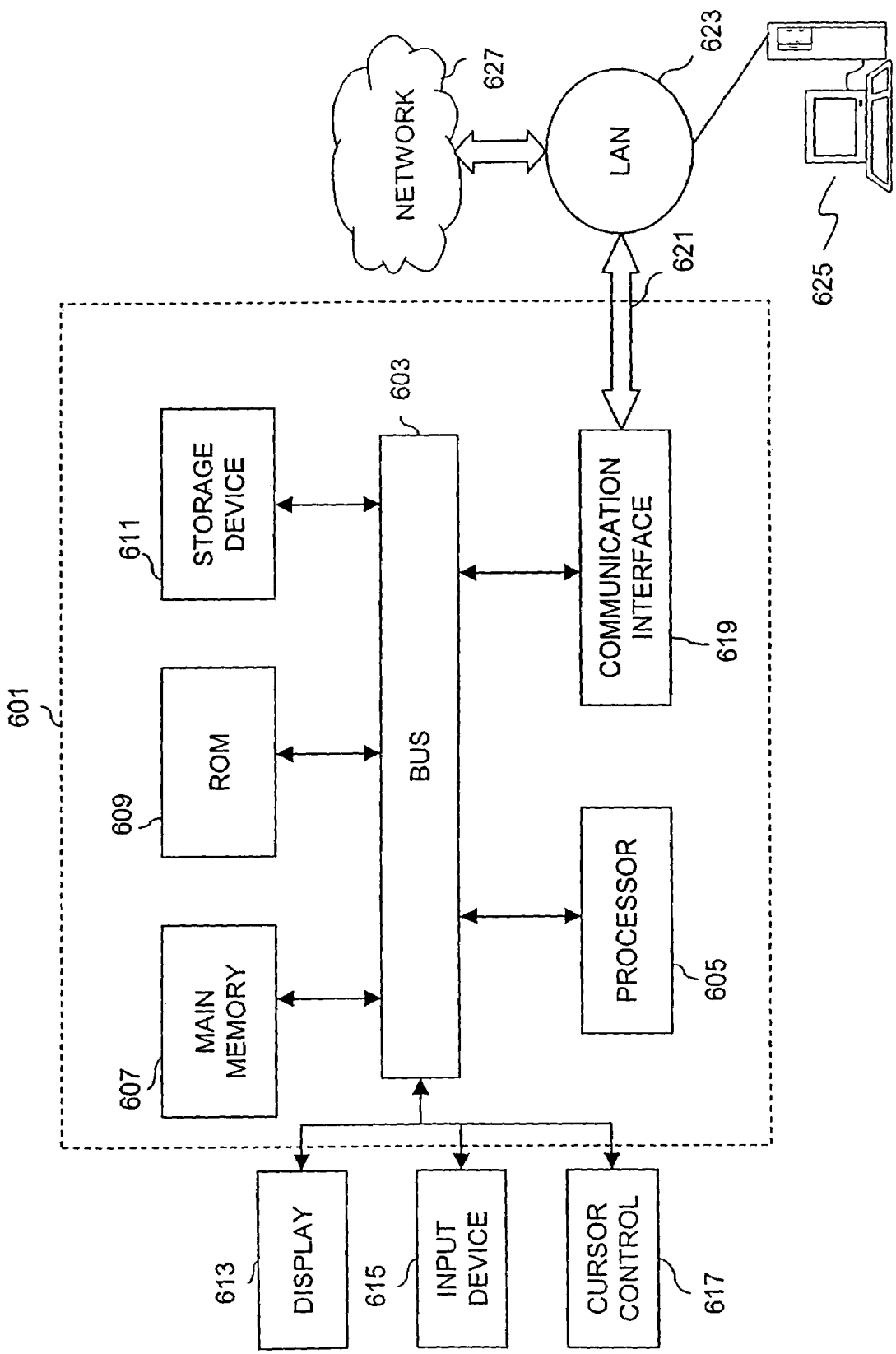
FIG. 6 is a diagram of a computer system that can perform the processes of encoding and decoding of space-time codes and space-frequency, in accordance with embodiments of the present invention.

FIG. 6 shows a diagram of a computer system that can perform the processes of encoding and decoding of the channel codes, in accordance with the embodiments of the present invention. Computer system 601 includes a bus 603 or other communication mechanism for communicating information, and a processor 605 coupled with bus 603 for processing the information. Computer system 601 also includes a main memory 607, such as a random access memory (RAM) or other dynamic storage device, coupled to bus 603 for storing information and instructions to be executed by processor 605. In addition, main memory 607 may be used for storing temporary variables or other intermediate information during execution of instructions to be executed by processor 605. Computer system 601 further includes a read only memory (ROM) 609 or other static storage device coupled to bus 603 for storing static information and instructions for processor 605. A storage device 611, such as a magnetic disk or optical disk, is provided and coupled to bus 603 for storing information and instructions.

Computer system 601 may be coupled via bus 603 to a display 613, such as a cathode ray tube (CRT), for displaying information to a computer user. An input device 615, including alphanumeric and other keys, is coupled to bus 603 for communicating information and command selections to processor 605. Another type of user input device is cursor control 617, such as a mouse, a trackball, or cursor direction keys for communicating direction information and command selections to processor 605 and for controlling cursor movement on display 613.

According to one embodiment, channel code generation within system 100 is provided by computer system 601 in response to processor 605 executing one or more sequences of one or more instructions contained in main memory 607. Such instructions may be read into main memory 607 from another computer-readable medium, such as storage device 611. Execution of the sequences of instructions contained in main memory 607 causes processor 605 to perform the process steps described herein. One or more processors in a multi-processing arrangement may also be employed to execute the sequences of instructions contained in main memory 607. In alternative embodiments, hard-wired circuitry may be used in place of or in combination with software instructions. Thus, embodiments are not limited to any specific combination of hardware circuitry and software.

Further, the instructions to support the generation of space-time codes and space-frequency codes of system 100 may reside on a computer-readable medium. The term "computer-readable medium" as used herein refers to any medium that participates in providing instructions to processor 605 for execution. Such a medium may take many forms, including but not limited to, non-volatile media, volatile media, and transmission media. Non-volatile media includes, for example, optical or magnetic disks, such as storage device 611. Volatile media includes dynamic memory, such as main memory 607. Transmission media includes coaxial cables, copper wire and fiber optics, including the wires that comprise bus 603. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 605 for execution. For example, the instructions may initially be carried on a magnetic disk of a remote computer. The remote computer can load the instructions relating to encoding and decoding of space-time codes used in system 100 remotely into its dynamic memory and send the instructions over a telephone line using a modem. A modem local to computer system 601 can receive the data on the telephone line and use an infrared transmitter to convert the data to an infrared signal. An infrared detector coupled to bus 603 can receive the data carried in the infrared signal and place the data on bus 603. Bus 603 carries the data to main memory 607, from which processor 605 retrieves and executes the instructions. The instructions received by main memory 607 may optionally be stored on storage device 611 either before or after execution by processor 605.

Computer system 601 also includes a communication interface 619 coupled to bus 603. Communication interface 619 provides a two-way data communication coupling to a network link 621 that is connected to a local network 623. For example, communication interface 619 may be a network interface card to attach to any packet switched local area network (LAN). As another example, communication interface 619 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 619 sends and receives electrical, electromagnetic or optical signals that carry digital data streams representing various types of information.

Network link 621 typically provides data communication through one or more networks to other data devices. For example, network link 621 may provide a connection through local network 623 to a host computer 625 or to data equipment operated by a service provider, which provides data communication services through a communication network 627 (e.g., the Internet). LAN 623 and network 627 both use electrical, electromagnetic or optical signals that carry digital data streams. The signals through the various networks and the signals on network link 621 and through communication interface 619, which carry the digital data to and from computer system 601, are exemplary forms of carrier waves transporting the information. Computer system 601 can transmit notifications and receive data, including program code, through the network(s), network link 621 and communication interface 619.

The techniques described herein provide several advantages over prior approaches to providing space-time codes. The two approaches of designing space-time codes and space-frequency codes optimally exploits both the spatial and frequency diversity available in the channel.

Obviously, numerous modifications and variations of the present invention are possible in light of the above teachings. It is therefore to be understood that within the scope of the appended claims, the invention may be practiced otherwise than as specifically described herein.

REFERENCES

[1] E. Teletar. Capacity of Multi-Antenna Gaussian Channels. *Technical Report, AT&T-Bell Labs*, June 1995.

[2] G. J. Foschini and M. Gans. On the Limits of Wireless Communication in a Fading Environment When Using Multiple Antennas. *Wireless Personal Communication*, 6:311-335, March 1998.

[3] V. Tarokh, N. Seshadri, and A. R. Calderbank. Space-Time Codes for High Data Rate Wireless Communication: Performance Criterion and Code Construction. *IEEE Trans. Info. Theory*, IT-44:774-765, March 1998.

[4] J.-C. Guey, M. R. Bell M. P. Fitz, and W.-Y. Kuo. Signal Design for Transmitter Diversity, Wireless Communication Systems over Rayleigh Fading Channels. *IEEE Vehicular Technology Conference*, pages 136-140, Atlanta, 1996.

[5] G. J. Foschini. Layered Space-Time Architecture for Wireless Communication in Fading Environments When Using Multiple Antennas. *Bell Labs Tech. J.*, 2, Autumn 1996.

[6] S. Lin and Jr. D. J. Costello. *Error Control Coding: Fundamentals and Applications*. Prentice-Hall, New Jersey, 1983.

What is claimed is:

1. A method comprising:
  receiving an encoded signal over a multi-input multi-output (MIMO) communication channel having Intersymbol Interference (ISI) channel characteristics;
  transforming the ISI channel characteristics to selective block fading characteristics;
  deinterleaving the encoded signal according to a mapping function that is based on the number of fading blocks associated with the communication channel and on code word length, wherein the mapping function is defined as $$\pi(i) = \left[\frac{i}{L_{ISI}}\right] + \frac{N}{L_{ISI}}(i)_{L_{ISI}},$$

wherein $L_{ISI}$ represents the number of fading blocks, $(\ )_m$ refers to the modulo m operation, $0 \leq i \leq N-1$, and N is the length of the code word, N being a multiple of $L_{ISI}$;
  decoding the encoded signal to output a space-frequency code having an algebraic construction based on the selective block fading characteristics;
  producing a baseband signal from the encoded signal; and
  applying a Fast Fourier Transform (FFT) to the baseband signal.

2. A method comprising:
  receiving an encoded signal over a multi-input multi-output (MIMO) communication channel having Intersymbol Interference (ISI) channel characteristics;
  transforming the ISI channel characteristics to selective block fading characteristics;
  deinterleaving the encoded signal according to a mapping function that is based on the number of fading blocks associated with the communication channel and on code word length, wherein the mapping function is defined as $$\pi(i) = \left[\frac{i}{L_{ISI}}\right] + \frac{N}{L_{ISI}}(i)_{L_{ISI}},$$

wherein $L_{ISI}$ represents the number of fading blocks, $(\ )_m$ refers to the modulo m operation, $0 \leq i \leq N-1$, and N is the length of the code word, N being a multiple of $L_{ISI}$; and
  decoding the encoded signal to output a space-frequency code having an algebraic construction based on the selective block fading characteristics,
  wherein the encoded signal was transmitted using an orthogonal frequency division multiplexing (OFDM) scheme.

3. An apparatus comprising:
  front-end circuitry configured to receive an encoded signal over a multi-input multi-output (MIMO) communication channel having Intersymbol Interference (ISI) channel characteristics, and to transform the ISI channel characteristics to selective block fading characteristics;
  a deinterleaver configured to deinterleave the encoded signal according to a mapping function that is based on the number of fading blocks associated with the communication channel and on code word length, wherein the mapping function is defined as $$\pi(i) = \sum_{k=0}^{\log_2(L_{ISI}^{(max)})} a_k \frac{N}{2^{k+1}} + \left[\frac{i}{L_{ISI}^{(max)}}\right],$$

$$a_k = \left(\frac{(i)L_{ISI}^{(max)} - \sum_{j=0}^{k-1} a_j 2^j}{2^k}\right),$$

wherein $L_{ISI}$ represents the number of fading blocks associated with the communication channel, $L_{ISI}^{(max)}$ is the maximum possible number of paths known, and the number of resolvable paths in the communication channel is $L_{ISI}=2^r$, r being an integer;

a decoder configured to decode the encoded signal to output a space-frequency code having an algebraic construction based on the selective block fading characteristics, wherein a baseband signal is derived from the encoded signal; and a transform logic configured to apply a Fast Fourier Transform (FFT) to the baseband signal.

4. An apparatus comprising:

front-end circuitry configured to receive an encoded signal over a multi-input multi-output (MIMO) communication channel having Intersymbol Interference (ISI) channel characteristics, and to transform the ISI channel characteristics to selective block fading characteristics;

a deinterleaver configured to deinterleave the encoded signal according to a mapping function that is based on the number of fading blocks associated with the communication channel and on code word length, wherein the mapping function is defined as $$\pi(i) = \sum_{k=0}^{\log_2(L_{ISI}^{(max)})} a_k \frac{N}{2^{k+1}} + \left[\frac{i}{L_{ISI}^{(max)}}\right],$$

$$a_k = \left(\frac{(i)L_{ISI}^{(max)} - \sum_{j=0}^{k-1} a_j 2^j}{2^k}\right),$$

wherein $L_{ISI}$ represents the number of fading blocks associated with the communication channel, $L_{ISI}^{(max)}$ is the maximum possible number of paths known, and the number of resolvable paths in the communication channel is $L_{ISI}=2^r$, r being an integer; and a decoder configured to decode the encoded signal to output a space-frequency code having an algebraic construction based on the selective block fading characteristics, wherein the encoded signal was transmitted using an orthogonal frequency division multiplexing (OFDM) scheme.

5. An apparatus comprising:

an orthogonal frequency division multiplexing (OFDM)- front end configured to receive a signal transmitted over a multi-input-multi-output (MIMO) communication channel, and to transform Intersymbol Interference (ISI) channel characteristics of the MIMO communication channel to selective block fading characteristics, wherein the received signal represents a code word generated according to an ISI channel stacking construction; and a transform logic configured to apply a transform to the received signal for output to a decoder, wherein the received signal includes a baseband signal that was passed through an inverse transform, wherein the received signal is deinterleaved according to a mapping function that is based on the number of fading blocks associated with the communication channel and on code word length, wherein the mapping function is defined as $$\pi(i) = \sum_{k=0}^{\log_2(L_{ISI}^{(max)})} a_k \frac{N}{2^{k+1}} + \left[\frac{i}{L_{ISI}^{(max)}}\right],$$

$$a_k = \left(\frac{(i)L_{ISI}^{(max)} - \sum_{j=0}^{k-1} a_j 2^j}{2^k}\right),$$

wherein $L_{ISI}$ represents the number of fading blocks associated with the communication channel, $L_{ISI}^{(max)}$ is the maximum possible number of paths known, and the number of resolvable paths in the communication channel is $L_{ISI}=2^r$, r being an integer, wherein the received signal was modulated using either BPSK (binary phase-shift keying) modulation or QPSK (quadrature phase-shift keying) modulation.

6. An apparatus comprising:

an orthogonal frequency division multiplexing (OFDM)- front end configured to receive a signal transmitted over a multi-input-multi-output (MIMO) communication channel, and to transform Intersymbol Interference (ISI) channel characteristics of the MIMO communication channel to selective block fading characteristics, wherein the received signal represents a code word generated according to an ISI channel stacking construction; and a transform logic configured to apply a transform to the received signal for output to a decoder, wherein the received signal includes a baseband signal that was passed through an inverse transform, wherein the received signal is deinterleaved according to a mapping function that is based on the number of fading blocks associated with the communication channel and on code word length, wherein the mapping function is defined as $$\pi(i) = \sum_{k=0}^{\log_2(L_{ISI}^{(max)})} a_k \frac{N}{2^{k+1}} + \left[\frac{i}{L_{ISI}^{(max)}}\right],$$

$$a_k = \left(\frac{(i)L_{ISI}^{(max)} - \sum_{j=0}^{k-1} a_j 2^j}{2^k}\right),$$

wherein $L_{ISI}$ represents the number of fading blocks associated with the communication channel, $L_{ISI}^{(max)}$ is the maximum possible number of paths known, and the number of resolvable paths in the communication channel is $L_{ISI}=2^r$, r being an integer, wherein the transform is a Fast Fourier Transform (FFT).

7. An apparatus comprising:

an orthogonal frequency division multiplexing (OFDM)- front end configured to receive a signal transmitted over a multi-input-multi-output (MIMO) communication channel, and to transform Intersymbol Interference (ISI) channel characteristics of the MIMO communication channel to selective block fading characteristics, wherein the received signal represents a code word generated according to an ISI channel stacking construction; and a transform logic configured to apply a transform to the received signal for output to a decoder, wherein the received signal includes a baseband signal that was passed through an inverse transform, wherein the received signal is deinterleaved according to a mapping function that is based on the number of fading blocks associated with the communication channel and on code word length, wherein the mapping function is defined as $$\pi(i) = \sum_{k=0}^{\log_2(L_{ISI}^{(max)})} a_k \frac{N}{2^{k+1}} + \left\lfloor \frac{i}{L_{ISI}^{(max)}} \right\rfloor,$$

$$a_k = \left( \frac{(i)L_{ISI}^{(max)} - \sum_{j=0}^{k-1} a_j 2^j}{2^k} \right),$$

wherein $L_{ISI}$ represents the number of fading blocks associated with the communication channel, $L_{ISI}^{(max)}$ is the maximum possible number of paths known, and the number of resolvable paths in the communication channel is $L_{ISI}=2^r$, r being an integer, wherein the encoded signal represents a code word having an algebraic construction defined by, $Y(D) = X(D)G(D)$, where $Y(D) = \lfloor Y_1(D) Y_2(D) \ldots Y_{L_t L_{ISI}}(D) \rfloor$, $X(D) = [X_1(D) X_2(D) \ldots X_k(D)]$, and $$G(D) = \begin{bmatrix} G_{1,1}(D) & G_{1,2}(D) & \cdots & G_{1,L_t L_{ISI}}(D) \\ G_{2,1}(D) & G_{2,2}(D) & \cdots & G_{1,L_t L_{ISI}}(D) \\ \vdots & \vdots & \ddots & \vdots \\ G_{k,1}(D) & G_{k,2}(D) & \cdots & G_{k,L_t L_{ISI}}(D) \end{bmatrix},$$

wherein the polynomials, X(D) and Y(D), correspond to a plurality of input signals and a plurality of output signals, respectively, $L_t$ representing the number of transmit antennas, $L_{ISI}$ representing the number of fading blocks associated with the communication channel, k representing number of input sequences.

8. The apparatus according to claim 7, wherein the construction of the code word further defines G as a set of binary full rank matrices $\{G:G=\lfloor g_{i,j} \rfloor_{L_t \times L_t}\}$ resulting from applying a number of simple row operations to an identity matrix $I_{L_t}$, and $\forall G_1 \in G$, $1 \leq i \leq L_t, 1 \leq i \leq L_{ISI}$, an autocorrelation function being specified as follows, $$R_i^{(G_m,m)}(D) = [g_{i,1}(m)I_k, g_{i,2}(m)I_k, \ldots, g_{i,L_t}(m)I_k] \begin{bmatrix} F_{(m-1)L_t+1}(D) \\ F_{(m-1)L_t+2}(D) \\ \vdots \\ F_{mL_t}(D) \end{bmatrix},$$

wherein m represents the $m^{th}$ fading block, and $F_l(D)$ is a column vector defined as follows, $$F_l(D) = \begin{bmatrix} G_{1,l}(D) \\ G_{2,l}(D) \\ \vdots \\ G_{k,l}(D) \end{bmatrix}.$$

* * * * *